US009076360B2

(12) United States Patent
Kim et al.

(10) Patent No.: US 9,076,360 B2

(45) Date of Patent: Jul. 7, 2015

(54) DISPLAY APPARATUS FOR DISPLAYING AN IMAGE IN A 2D MODE AND A 3D MODE USING A PATTERNED RETARDER

(75) Inventors: Taeho Kim, Asan-si (KR); Sang-Jae Kim, Seongnam-si (KR); Kwang-Hyun Kim, Gunpo-si (KR); Daewon Kim, Dongducheon-si (KR); Ji-Hoon Kim, Hwaseong-si (KR); Seungbeom Park, Seoul (KR); Beong-hun Beon, Cheonan-si (KR); Seunghee Lee, Seoul (KR); GwanYoung Na, Osan-si (KR)

(73) Assignee: Samsung Display Co., Ltd., Yongin (KR)

( * ) Notice: Subject to any disclaimer, the term of this patent is extended or adjusted under 35 U.S.C. 154(b) by 216 days.

(21) Appl. No.: 13/340,402

(22) Filed: Dec. 29, 2011

(65) Prior Publication Data

US 2013/0027439 A1 Jan. 31, 2013

(30) Foreign Application Priority Data

Jul. 27, 2011 (KR) ........................ 10-2011-0074603

(51) Int. Cl.

*G02F 1/1335* (2006.01)
*G09G 3/00* (2006.01)
*G09G 3/36* (2006.01)

(52) U.S. Cl.

CPC .............. *G09G 3/003* (2013.01); *G09G 3/3648* (2013.01); *G09G 2300/0426* (2013.01); *G09G 2300/0443* (2013.01)

(58) Field of Classification Search

CPC ................................................... G02B 27/2228
USPC ........................................................... 349/15
See application file for complete search history.

(56) References Cited

U.S. PATENT DOCUMENTS

| | | | | |
|---|---|---|---|---|
| 6,055,013 | A * | 4/2000 | Woodgate et al. | 348/59 |
| 6,084,647 | A * | 7/2000 | Hatano et al. | 349/15 |
| 8,519,908 | B2 * | 8/2013 | Lee et al. | 345/6 |
| 2003/0085861 | A1 * | 5/2003 | Hoshino | 345/89 |
| 2003/0227429 | A1 * | 12/2003 | Shimoshikiryo | 345/90 |
| 2004/0075674 | A1 * | 4/2004 | Bu | 345/690 |
| 2004/0113879 | A1 * | 6/2004 | Sekiguchi et al. | 345/94 |
| 2008/0013001 | A1 * | 1/2008 | Jang et al. | 349/15 |
| 2012/0057780 | A1 * | 3/2012 | Matsumoto | 382/154 |
| 2012/0086706 | A1 * | 4/2012 | Lee et al. | 345/419 |

FOREIGN PATENT DOCUMENTS

| | | |
|---|---|---|
| JP | 2004-170693 | 6/2004 |
| JP | 2010-204389 | 9/2010 |
| KR | 10-2005-0078288 | 8/2005 |

* cited by examiner

*Primary Examiner* — Roy Rabindranath
(74) *Attorney, Agent, or Firm* — H.C. Park & Associates, PLC

(57) ABSTRACT

A display apparatus including a display panel and a patterned retarder disposed on the display panel. The display apparatus displays a first image in a 2D mode and displays a second image including a left-eye image and a right-eye image in a 3D mode. Each of the sub-pixels included in the display panel includes two or three sub-pixel electrodes, and the patterned retarder includes a first retarder and a second retarder, which provide different directivities from each other to the left-eye image and the right-eye image, respectively. The first retarder is disposed corresponding to at least a portion of the sub-pixels and the second retarder is disposed corresponding to a remaining portion of the sub-pixels.

13 Claims, 19 Drawing Sheets

DISPLAY APPARATUS FOR DISPLAYING AN IMAGE IN A 2D MODE AND A 3D MODE USING A PATTERNED RETARDER

CROSS-REFERENCE TO RELATED APPLICATION

This application claims priority from and the benefit of Korean Patent Application No. 10-2011-0074603 filed on Jul. 27, 2011, which is hereby incorporated by reference for all purposes as if fully set forth herein.

BACKGROUND

1. Field

Exemplary embodiments of the present invention relate to a display apparatus.

More particularly, the present invention relates to a display apparatus capable of improving a vertical resolution and visibility of a three-dimensional image.

2. Discussion of the Background

A display apparatus displays a three-dimensional (3D) image using a stereoscopic 3D technique or an autostereoscopic 3D technique.

The stereoscopic 3D technique is classified into a glass type and a non-glass type. The glass type display apparatus changes a polarizing direction of a left-eye image and a right-eye image using a patterned retarder or displays the left-eye image and the right-eye image according to a predetermined time interval, thereby displaying the 3D image.

A vertical resolution of the 3D image provided by the glass type display apparatus is lower than a vertical resolution of a two-dimensional (2D) image. In addition, visibility of the 3D image is degraded due to cross-talk generated at the position of an upward or downward viewing angle.

SUMMARY OF THE INVENTION

Exemplary embodiments of the present invention provide a display apparatus capable of improving a vertical resolution and visibility of a three-dimensional image.

Additional features of the invention will be set forth in the description which follows, and in part will be apparent from the description, or may be learned by practice of the invention.

An exemplary embodiment of the present invention discloses a display apparatus includes a driving circuit, a display panel, and a patterned retarder. The driving circuit receives an input image signal, converts the input image signal into first and second data voltages having voltage levels different from each other at a same gray scale in a 2D mode, and converts the input image signal into a left-eye data voltage and a right-eye data voltage in a 3D mode. The display panel includes a plurality of pixels each having at least one sub-pixel including a first sub-pixel electrode and a second sub-pixel electrode. The first and second sub-pixel electrodes is respectively receive a different one of the first and second data voltages in the 2D mode to display a first image, and respectively receive a different one of the left-eye data voltage and the right-eye data voltage in the 3D mode to display a second image, which includes a left-eye image and a right-eye image. The patterned retarder is disposed on the display panel to transmit the first image or the second image and includes at least one first retarder providing a first directivity to the left-eye image and at least one second retarder providing a second directivity different from the first directivity to the right-eye image. The first retarder is disposed corresponding to one of the first sub-pixel electrode and the second sub-pixel electrode and the second retarder is disposed corresponding to the other one of the first sub-pixel electrode and the second sub-pixel electrode.

An exemplary embodiment of the present invention also discloses a display apparatus includes a driving circuit, a display panel, and a patterned retarder. The driving circuit receives an input image signal, converts the input image signal into first, second, and third data voltages having different voltage levels from each other at a same gray scale in a 2D mode, converts the input image signal into a left-eye data voltage and a right-eye data voltage, and outputs the left- and right-eye data voltages together with a black gray scale voltage in a 3D mode. The display panel includes a plurality of pixels each having at least one sub-pixel including a first sub-pixel electrode, a second sub-pixel electrode, and a third sub-pixel electrode that are sequentially arranged. The first, second, and third sub-pixel electrodes respectively receive a different one of the first, second, and third data voltages in the 2D mode to display a first image. The first and third sub-pixel electrodes respectively receive a different one of the left-eye data voltage and the right-eye data voltage, and the second sub-pixel electrode receives the black gray scale voltage, in the 3D mode to display a second image including a left-eye is image and a right-eye image. The patterned retarder is disposed on the display panel to transmit the first image or the second image and includes at least one first retarder providing a first directivity to the left-eye image and at least one second retarder providing a second directivity different from the first directivity to the right-eye image. The first retarder is disposed corresponding to one of the first sub-pixel electrode and the third sub-pixel electrode and the second retarder is disposed corresponding to the other one of the first sub-pixel electrode and the third sub-pixel electrode.

According to the above, the sub-pixel includes the first and second sub-pixel electrodes and the first and second retarders are disposed corresponding to the sub-pixel. In the 3D mode, the first and second sub-pixel electrodes respectively display the left-eye image and the right-eye image, thereby improving a vertical resolution of the second image.

In addition, the sub-pixel includes the first, second, and third sub-pixel electrodes sequentially arranged. In the 3D mode, the first sub-pixel displays the left-eye image and the third sub-pixel displays the right-eye image, and the second sub-pixel electrode displays the black gray scale image, to thereby prevent a cross-talk phenomenon and improve visibility of the second image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute part of this specification, is illustrate embodiments of the invention, and together with the description serve to explain the principles of the invention.

DETAILED DESCRIPTION OF THE ILLUSTRATED EMBODIMENTS

Figure 1:
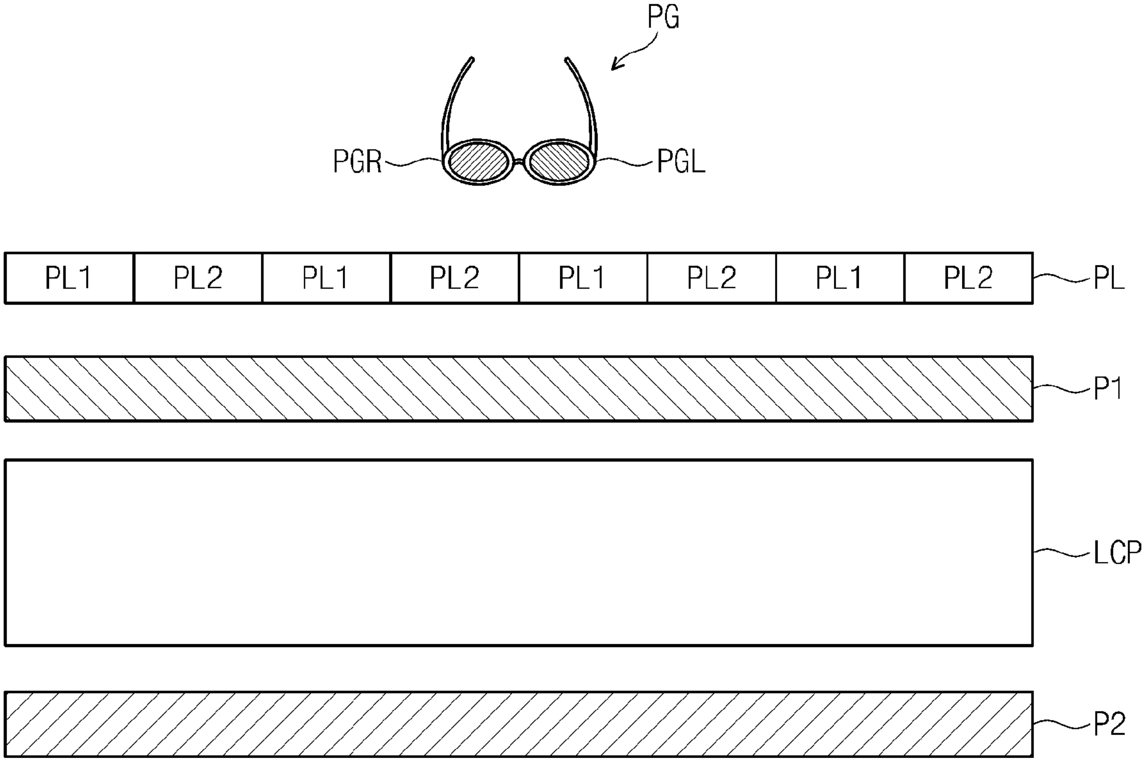
FIG. 1 is a view showing a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
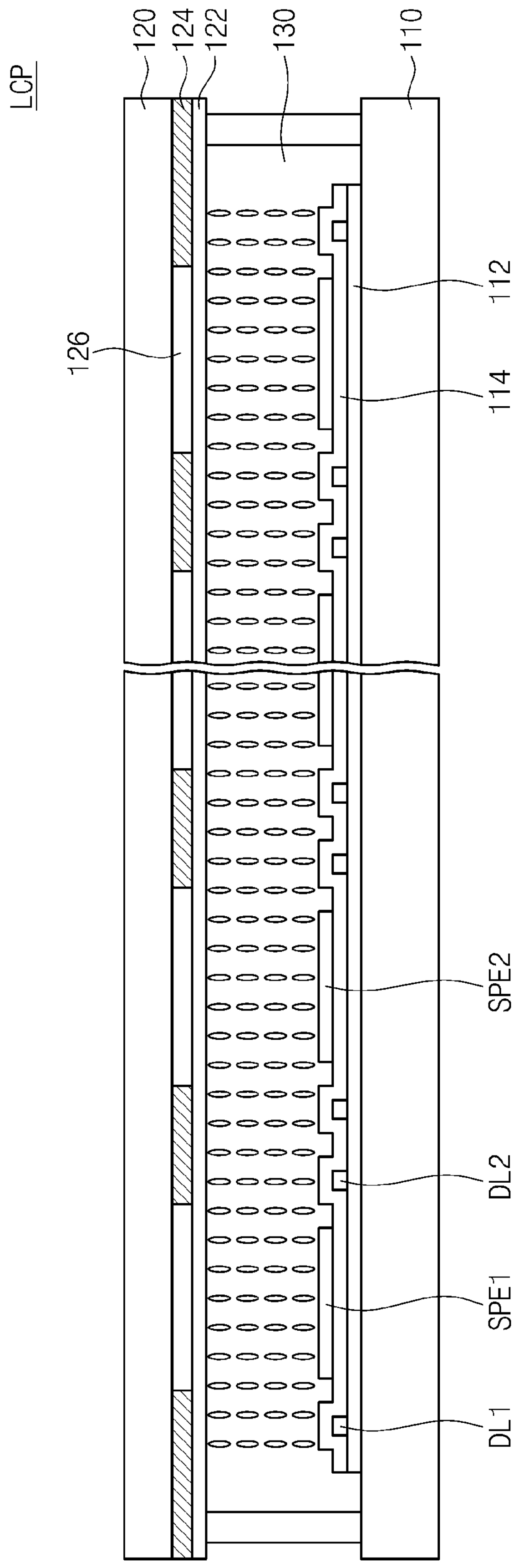
FIG. 2 is a cross-sectional view showing a display panel shown in FIG. 1.
Figure 3:
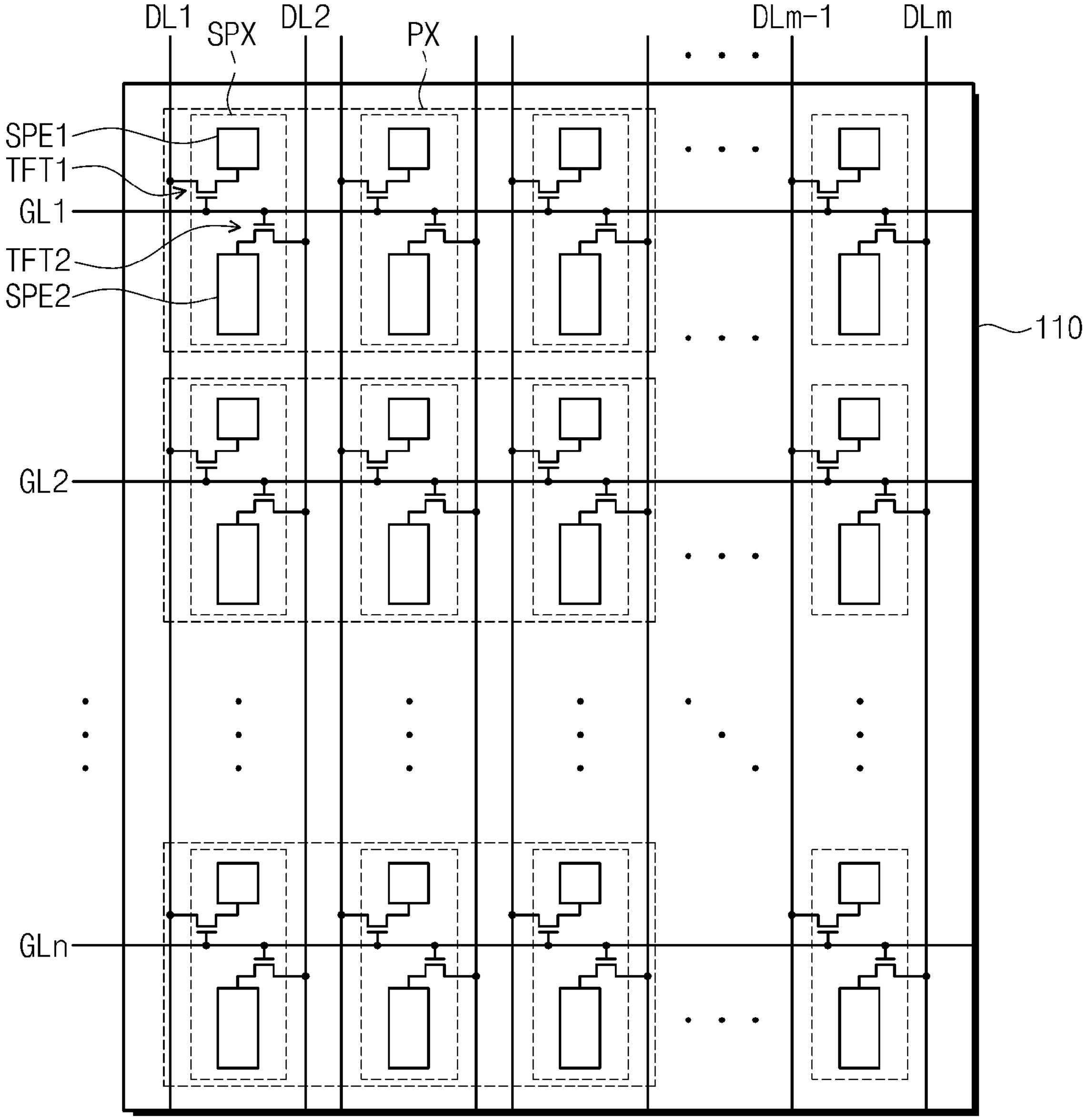
FIG. 3 is a view showing a first substrate shown in FIG. 2.

FIG. 1 is a view showing a display apparatus according to an exemplary embodiment of the present invention. FIG. 2 is a cross-sectional view showing a display panel shown in FIG. 1. FIG. 3 is a view showing a first substrate shown in FIG. 2.

Figure 4:
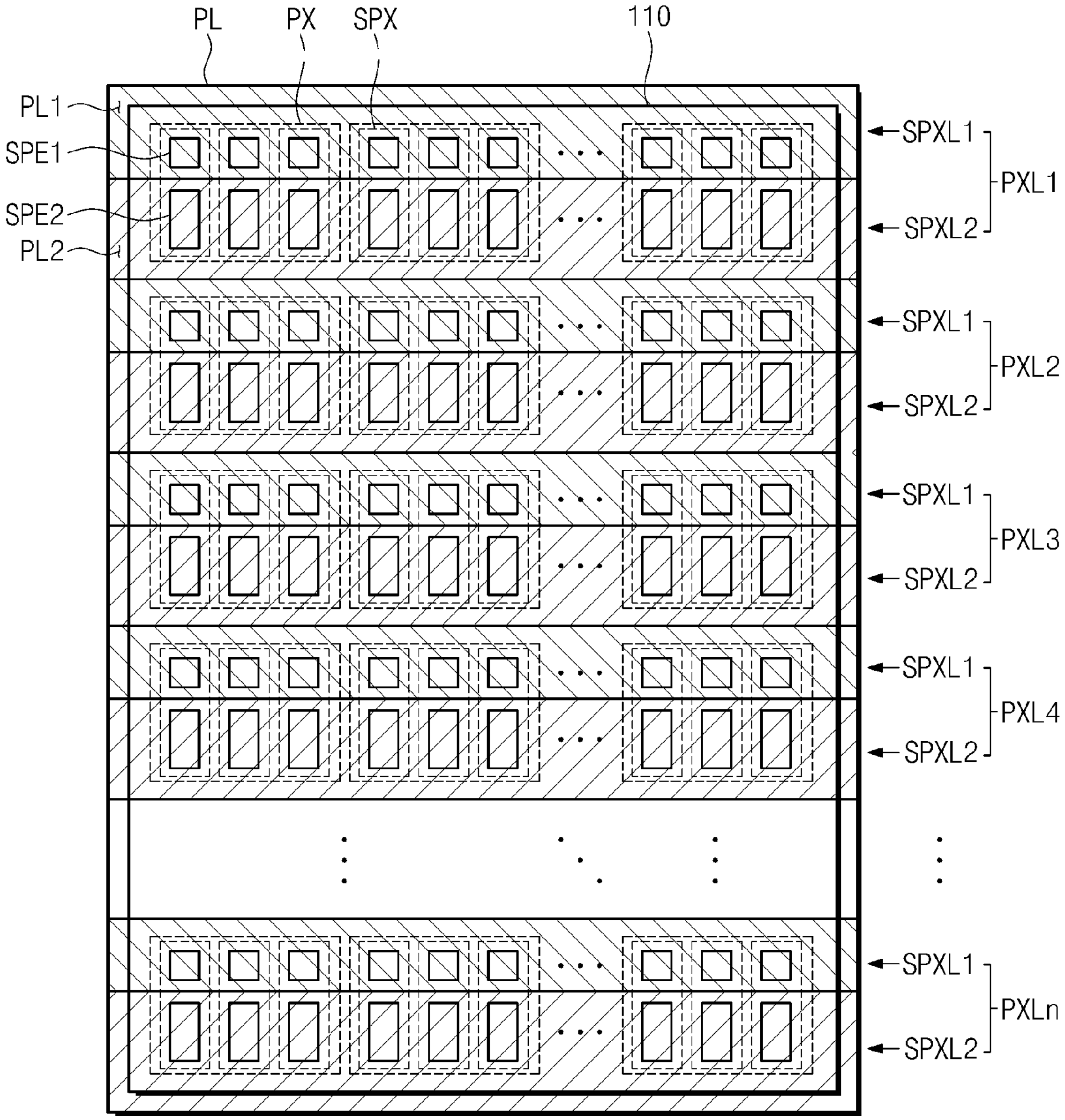
FIG. 4 is a view showing an arrangement relation between the first substrate shown in FIG. 1 and a patterned retarder shown in FIG. 1.
Figure 5:
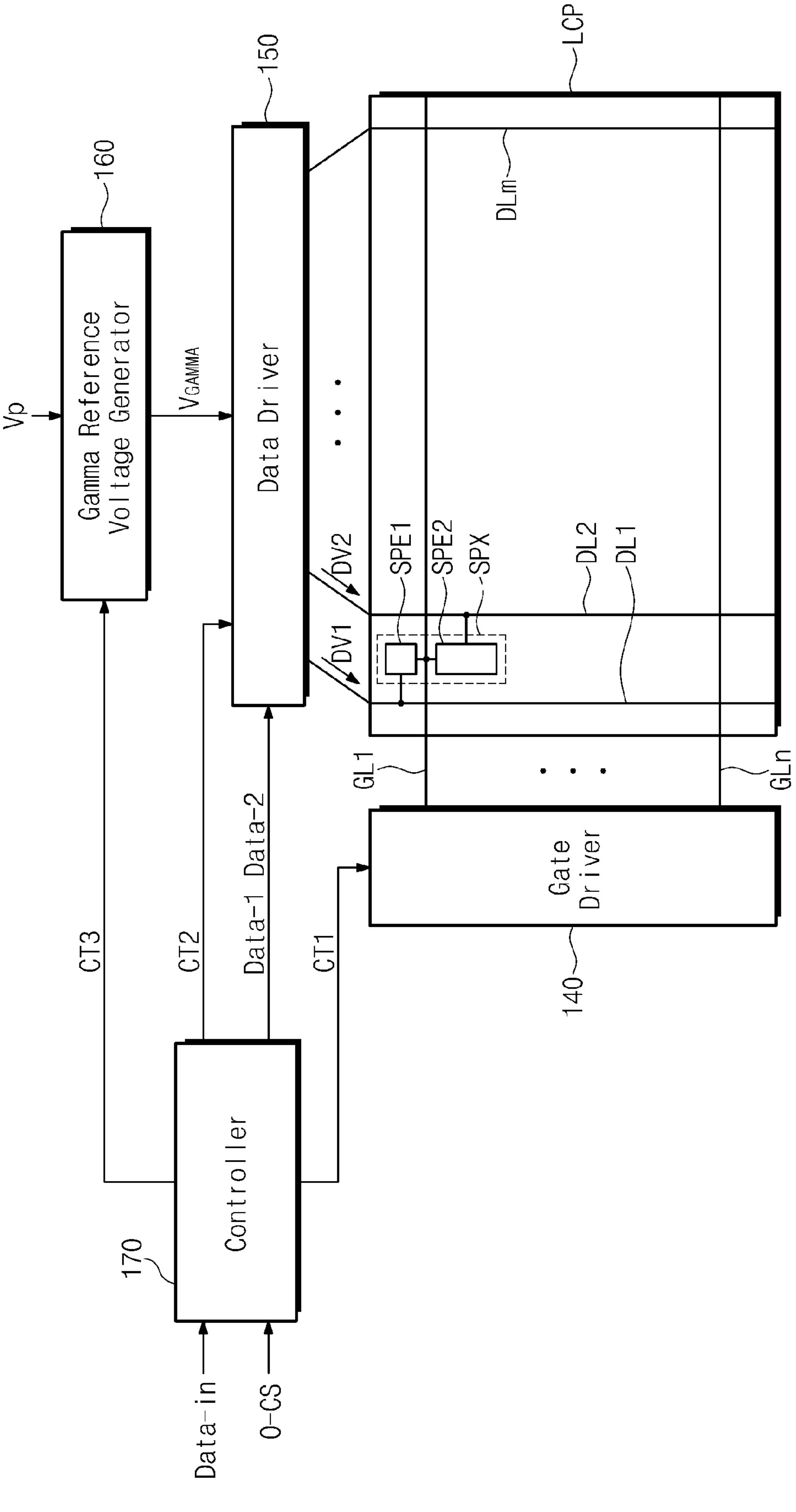
FIG. 5 is a block diagram showing a display panel when the display apparatus of FIG. 1 is driven in a 2D mode.
Figure 6:
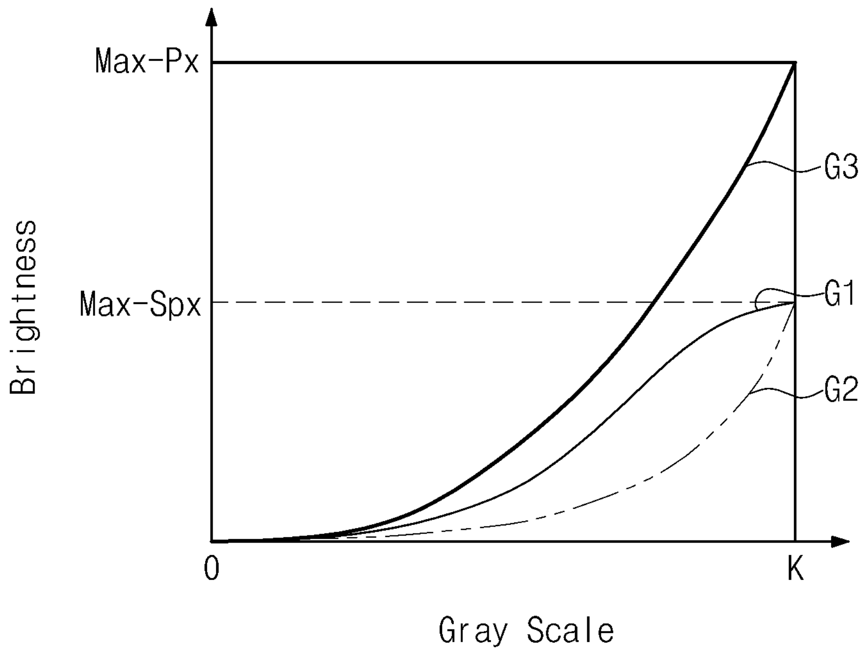
FIG. 6 is a graph showing a gray scale versus brightness when the display apparatus of FIG. 1 is driven in the 2D mode.
Figure 7:
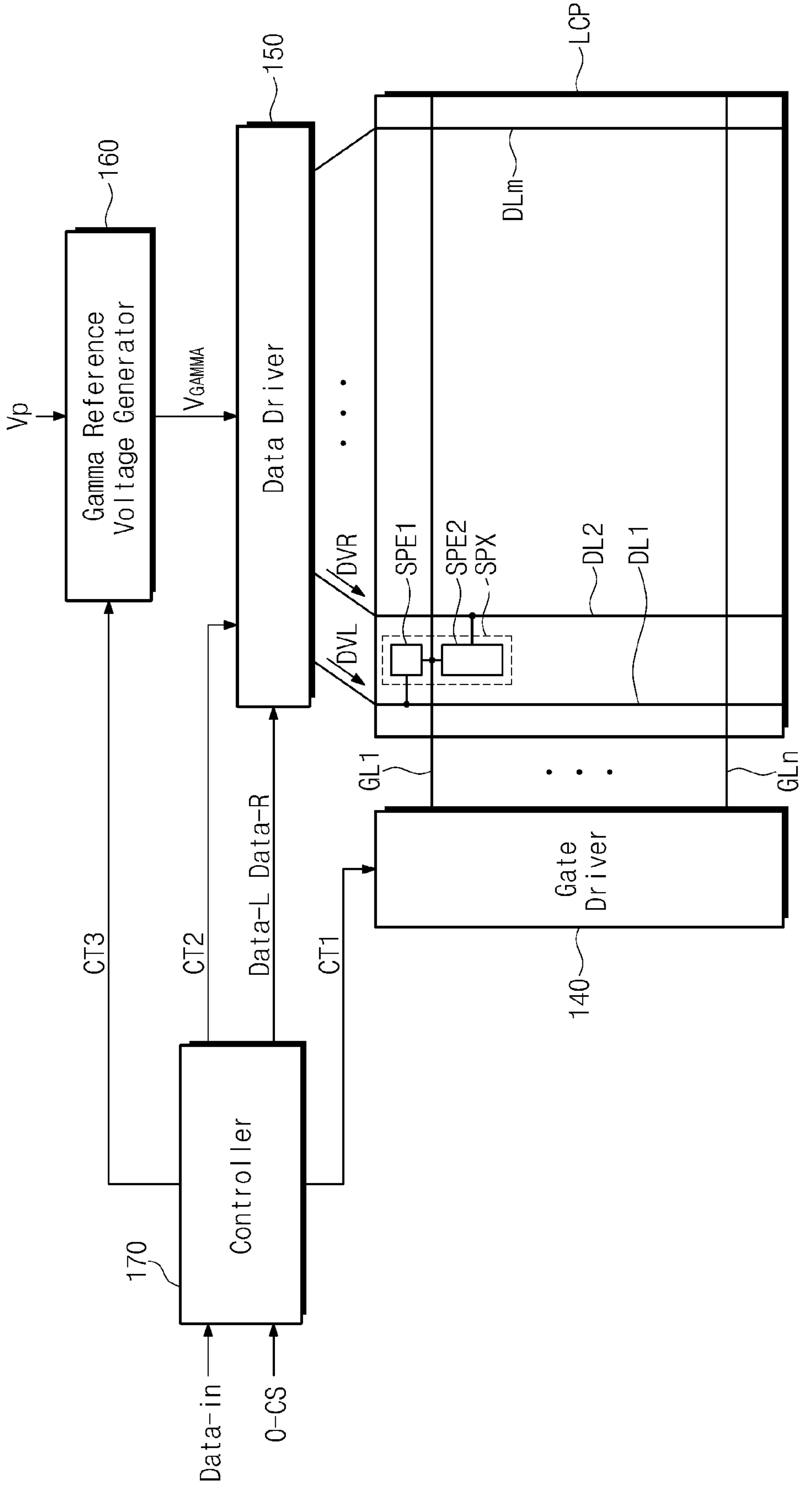
FIG. 7 is a block diagram showing a display panel when the display apparatus of FIG. 1 is driven in a 3D mode.
Figure 8:
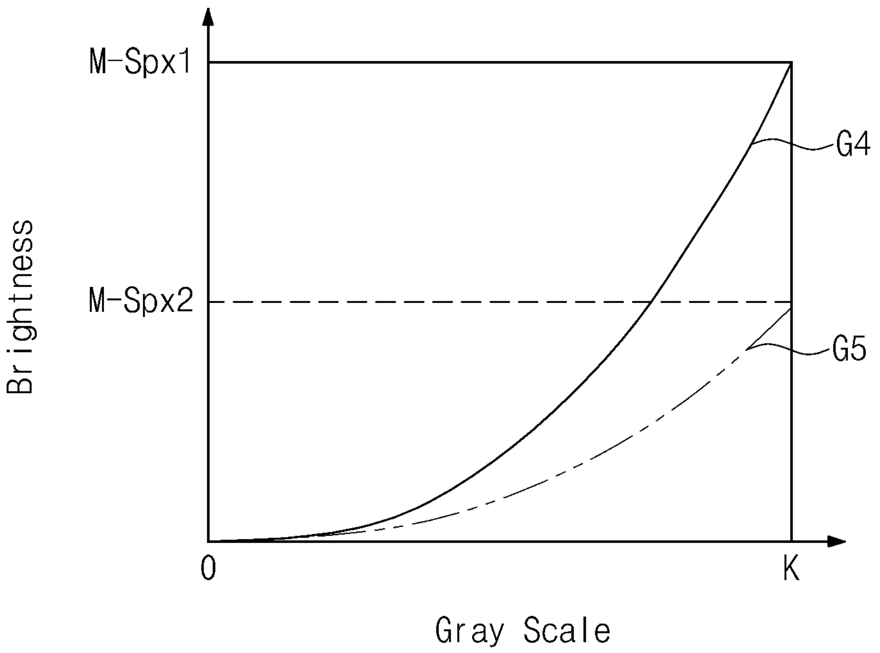
FIG. 8 is a graph showing a gray scale versus brightness when the display apparatus of FIG. 1 is driven in the 3D mode.

FIG. 4 is a view showing an arrangement relation between the first substrate shown in FIG. 1 and a patterned retarder shown in FIG. 1. FIG. 5 is a block diagram showing a display panel when the display apparatus of FIG. 1 is driven in a 2D mode. FIG. 6 is a graph showing a gray scale versus brightness when the display apparatus of FIG. 1 is driven in the 2D mode. FIG. 7 is a block diagram showing a display panel when the display apparatus of FIG. 1 is driven in a 3D mode. FIG. 8 is a graph showing a gray scale versus brightness when the display apparatus of FIG. 1 is driven in the 3D mode.

As shown in FIGS. 1 to 8, the display apparatus includes a display panel, a driving circuit, and a patterned retarder PL.

The display panel displays a first image during the 2D mode and a second image during the 3D mode. The first image is a two-dimensional image and the second image is a three-dimensional image including a left-eye image and a right-eye image. The display apparatus is driven in the 2D mode or the 3D mode according to a control signal input by a user.

The display apparatus may further include a polarizing plate to change the light for the left-eye image and the light for the right-eye image generated by the display panel into a linearly polarized light. The lights for the left- and right-eye images, which are linearly polarized, are incident to the patterned retarder PL. That is, the polarizing plate is disposed between the display panel and the patterned retarder PL.

Various display panels, such as a liquid crystal display panel, an organic light emitting display panel, an electrophoretic display panel, an electro-wetting display panel, etc., may be used as the display panel. In the present exemplary embodiment, the liquid crystal display panel including a liquid crystal layer disposed between two substrates will be described as the display panel.

The display apparatus including the liquid crystal display panel LCP includes upper and lower polarizing plates P1 and P2 and a backlight unit (not shown) providing a light to the liquid crystal display panel LCP. The upper polarizing plate P1 is disposed on the liquid crystal display panel LCP and the patterned retarder PL is disposed on the upper polarizing plate P1. The lower polarizing plate P2 is disposed under the liquid crystal display panel LCP and the backlight unit is disposed under the lower polarizing plate P2.

When the liquid crystal display panel LCP displays the second image in the 3D mode, the patterned retarder PL provides a first directivity to the second image exiting through a first area of the liquid crystal display panel LCP, and a second directivity different from the first directivity to the second image exiting through a second area different from the first area of the liquid crystal display panel LCP. Accordingly, the second image transmitting through the patterned retarder PL may be divided into the left-eye image having the first directivity and the right-eye image having the second directivity.

In detail, the patterned retarder PL includes at least one first retarder PL1 providing the first directivity to the linearly polarized light passing through the upper polarizing plate P1 and at least one second retarder PL2 providing the second directivity to the linearly polarized light passing through the upper polarizing plate P1.

The linearly polarized light incident to the first retarder PL1 after passing through the upper polarizing plate P1 may become a circularly polarized light, an elliptically polarized light, or a linearly polarized light while passing through the first retarder PL1. In addition, the linearly polarized light incident to the second retarder PL1 after passing through the upper polarizing plate P1 may become a circularly polarized light, an elliptically polarized light, or a linearly polarized light while passing through the second retarder PL1.

For instance, the first retarder PL1 may change the linearly polarized light to a left-circularly polarized light and the second retarder PL2 may change the linearly polarized light to a right-circularly polarized light. In this case, each of the first and second retarders PL1 and PL2 may be a λ/4 phase difference plate, where the first retarder PL1 has a slow axis crossing a slow axis of the second retarder PL2.

According to exemplary embodiments, one of the first retarder PL1 and the second retarder PL2 may be a λ/2 phase difference plate and the other one of the first retarder PL1 and the second retarder PL2 may be a plate that does not cause any phase difference. A pair of polarizing glasses PG includes a left-eye lens PGL corresponding to the left-eye of the user and a right-eye lens PGR corresponding to the right-eye of the user. The left-eye lens PGL transmits only the left-eye image and the right-eye lens PGR transmits only the right-eye image. The left-eye lens PGL may include the one of the first and second retarders PL1 and PL2 which transmits the left-eye image, and the right-eye lens PGR may include the one of the first and is second retarders PL1 and PL2 which transmits the right-eye image.

Referring to FIGS. 2 and 3, the liquid crystal display panel LCP includes a first substrate 110, a second substrate 120 facing the first substrate 110, and a liquid crystal layer 130 disposed between the first substrate 110 and the second substrate 120 and including liquid crystal molecules. FIG. 2 shows a vertical alignment mode liquid crystal display panel in which the liquid crystal molecules having a negative dielectric anisotropy are vertically aligned.

The liquid crystal display panel LCP includes a plurality of pixels PX, each having at least one sub-pixel SPX. The pixels PX are arranged on the first substrate 110. The first substrate 110 includes a plurality of gate lines GL1 to GLn extended in a row direction and arranged in a column direction and a plurality of data lines DL1 to DLm extended in the column direction and arranged in the row direction. The data lines DL1 to DLm are electrically insulated from the gate lines GL1 to GLn while crossing the gate lines GL1 to GLn.

The pixels PX may be arranged in an N rows by M columns matrix, where N and M are each a natural number greater than 1. In the present exemplary embodiment, each of the pixels PX may include three sub-pixels SPX and the three sub-pixels SPX may be arranged in the row direction.

Each of the sub-pixels SPX includes a first sub-pixel electrode SPE1 and a second sub-pixel electrode SPE2. The first and second sub-pixel electrodes SPE1 and SPE2 in each sub-pixel SPX may be arranged in the column direction. The first sub-pixel electrode SPE1 and the second sub-pixel electrode SPE2 are individually driven, so the first and second sub-pixel electrodes SPE1 and SPE2 may receive different pixel voltages from each other. Thus, the first and second sub-pixel electrodes SPE1 and SPE2 belong to different domains, thereby compensating for a viewing angle of the first image displayed in the 2D mode.

In addition, the area of the first sub-pixel electrode SPE1 is different from the area of the second sub-pixel electrode SPE2. For instance, when a pixel voltage applied to the first sub-pixel electrode SPE1 is higher than a pixel voltage applied to the second sub-pixel electrode SPE2, the first sub-pixel electrode SPE1 may have an area smaller than the area of the second sub-pixel electrode SPE2, as shown in FIG. 3. In the present exemplary embodiment, the area of the first sub-pixel electrode SPE1 may be half of the area of the second sub-pixel electrode SPE2.

Hereinafter, the sub-pixels will be described in detail with reference to FIGS. 2 and 3. However, since the sub-pixels have the same structure and function, one sub-pixel will be described as a representative example.

Each sub-pixel SPX includes a first thin film transistor TFT1 and a second thin film transistor TFT2 to switch the pixel voltages respectively applied to the first and second sub-pixel electrodes SPE1 and SPE2 that are individually driven. The first thin film transistor TFT1 is connected to the first sub-pixel electrode SPE1 and the second thin film transistor TFT2 is connected to the second sub-pixel electrode SPE2. Each of the first and second thin film transistors TFT1 and TFT2 includes a gate electrode, an active layer, a source electrode, and a drain electrode.

The gate electrode of each of the first and second thin film transistors TFT1 and TFT2 is branched from a first gate line GL1 among the gate lines GL1 to GLn. A gate insulating layer 112 is disposed on the first substrate 110 to cover the first gate line GL1 and the gate electrode. The active layer is disposed on the gate insulating layer 112. The active layer is formed in areas in which the first and second thin film transistors TFT1 and TFT2 are respectively formed and has an island shape. The source electrode and the drain electrode are is disposed on the active layer to be spaced apart from each other, thereby exposing a portion of the active layer.

In addition, the data lines DL1 to DLm are disposed on the gate insulating layer 112. The data lines DL1 to DLm include a first data line DL1 insulated from the first gate line GL1 while crossing the first gate line GL1 and a second data line DL2 substantially parallel to the first data line DL1 and electrically insulated from the first data line DL1 while crossing the first gate line GL1. The source electrode of the first thin film transistor TFT1 is branched from the first data line DL1 and the source electrode of the second thin film transistor TFT2 is branched from the second data line DL2.

Further, a protective layer 114 is disposed on the gate insulating layer 112 to cover the source electrode, the drain electrode, and the exposed portion of the active layer. To this end, the protective layer 114 is formed of an insulating material. The protective layer 114 is provided with first and second contact holes to respectively expose the drain electrodes of the first and second thin film transistors TFT1 and TFT2. The first sub-pixel electrode SPE1 and the second sub-pixel electrode SPE2 are disposed on the protective layer 114. The first sub-pixel electrode SPE1 is electrically connected to the drain electrode of the first thin film transistor TFT1 through the first contact hole. The second sub-pixel electrode SPE2 is electrically connected to the drain electrode of the second thin film transistor TFT2 through the second contact hole.

The second substrate 120 includes a common electrode 122 disposed on a surface thereof facing the first substrate 110. In the present exemplary embodiment, the common electrode 122 is disposed on the second substrate 120 in a vertical electric field driving method, such as the vertical alignment mode or a twisted nematic mode, but it should not be limited is thereto or thereby. That is, in a horizontal electric field driving method, such as an in-plane switching mode, the common electrode 122 may be disposed on the first substrate 110 together with the first and second sub-pixel electrodes SPE1 and SPE2.

The second substrate 120 may further include a light blocking member 124, e.g., a black matrix. The light blocking member 124 includes a plurality of openings formed therethrough and the openings have the same shape as the pixels PX disposed on the first substrate 110. The second substrate 120 further includes a plurality of color pixels 126 respectively disposed in the openings. As described above, in the case where each pixel PX includes the three sub-pixels SPX, each color pixel 126 includes a red sub-pixel, a green sub-pixel, and a blue sub-pixel. The three color sub-pixels are disposed corresponding to the three sub-pixels SPX. Meanwhile, the color pixels 126 may be disposed on the first substrate 110 according to exemplary embodiments. For instance, the color pixels 126 may be disposed between the protective layer 114 and the first sub-pixel electrode SPE1 and between the protective layer 114 and the second sub-pixel electrode SPE2.

Referring to FIG. 4, the patterned retarder PL is disposed on the liquid crystal display panel LCP and includes at least one first retarder PL1 and at least one second retarder PL2.

A plurality of the first retarders PL1 and a plurality of the second retarders PL2 may be provided, as shown in FIG. 4.

Each of the first retarders PL1 is disposed corresponding to one of the first sub-pixel electrode SPE1 and the second sub-pixel electrode SPE2, and each of the second retarders PL2 is disposed corresponding to the other one of the first sub-pixel electrode SPE1 and the second sub-pixel electrode SPE2. For example, the first retarder PL1 is disposed corresponding is to the first sub-pixel electrode SPE1 and the second retarder PL2 is disposed corresponding to the second sub-pixel electrode SPE2.

Each of the N pixel rows PXL1 to PXLn of the N rows by M columns matrix of the pixels PX includes a first sub-pixel row SPXL1 and a second sub-pixel row SPXL2, which are arranged in the column direction. The first-sub-pixel electrodes SPE1 of the sub-pixels SPX included in each of the pixel rows PXL1 to PXLn are arranged in the first sub-pixel row SPXL1, and the second sub pixel electrodes SPE2 of the sub-pixels SPX included in each of the pixel rows PXL1 to PXLn are arranged in the second sub-pixel row SPXL2. In other words, the first and second sub-pixel electrodes SPE1 and SPE2 included in each of the pixel rows PXL1 to PXLn may be arranged in the same way.

Meanwhile, the first retarder PL1 is disposed corresponding to the first sub-pixel row SPXL1 and the second retarder PL2 is disposed corresponding to the second sub-pixel row SPXL2. That is, the first retarder PL1 and the second retarder PL2 are disposed respectively corresponding to the first sub-pixel electrode SPE1 and the second sub-pixel electrode SPE2 included in each sub-pixel SPX.

For instance, when the pixels PX are arranged in 1080 rows by 1920 columns, the patterned retarder PL includes 1080 (one thousand eighty) first retarders PL1 corresponding to the first sub-pixel rows SPXL1 and 1080 (one thousand eighty) second retarders PL2 corresponding to the second sub-pixel rows SPXL2. When the first and second sub-pixel electrodes SPE1 and SPE2 respectively display the left-eye image and the right-eye image in the 3D mode, the first retarders PL1 provide the first directivity on the left-eye image exiting from the first sub-pixel row SPXL1 and the second retarders PL2 provide the second directivity on the right-eye image exiting from the second sub-pixel row SPXL2.

Thus, when the liquid crystal display panel LCP displays the second image in the 3D mode, the left-eye image has the first directivity through the first retarder PL1 and the right-eye image has the second directivity through the second retarder PL2. Then, the left-eye image is provided to the left-eye of the user through the left-eye lens PGL and the right-eye image is provided to the right-eye of the user through the right-eye lens PGR.

Hereinafter, a method of driving the liquid crystal display panel LCP will be described in detail with reference to FIGS. 3 and 5 to 8. The driving circuit applies a data voltage to the liquid crystal display panel LCP in the 2D mode, which is different from a data voltage applied to the liquid crystal display panel LCP in the 3D mode.

The driving circuit applies a first data voltage DV1 and a second data voltage DV2 having a voltage level different from that of the first data voltage DV1 to the liquid crystal display panel LCP in the 2D mode, thereby allowing the first image to have a predetermined gray scale. The first data voltage DV1 is applied to one of the first sub-pixel electrode SPE1 and the second sub-pixel electrode SPE2 and the second data voltage DV2 is applied to the other one of the first sub-pixel electrode SPE1 and the second sub-pixel electrode SPE2.

In addition, the driving circuit applies a left-eye data voltage DVL according to the left-eye image and a right-eye data voltage DVR according to the right-eye image to the liquid crystal display panel LCP in the 3D mode, such that the display apparatus displays the second image including the left-eye image and the right-eye image. The left-eye data voltage DVL is applied to one of the first sub-pixel electrode SPE1 and the second sub-pixel electrode SPE2 and the right-eye data voltage DVR is applied to the other one of the first sub-pixel electrode SPE1 and the second sub-pixel electrode SPE2.

Hereinafter, the driving of the display apparatus will be described in detail in the 2D mode with reference to FIGS. 3 and 5. In the present exemplary embodiment, since the sub-pixels SPX are driven in the same way, one sub-pixel SPX will be described as a representative example. In addition, the first data voltage DV1 and the second data voltage DV2 are applied to the first sub-pixel electrode SPE1 and the second sub-pixel electrode SPE2, respectively.

The driving circuit includes a gate driver 140, a data driver 150, a gamma reference voltage generator 160, and a controller 170.

The controller 170 controls the gate driver 140 and the data driver 150 in response to a 2D/3D mode selecting signal applied through a user interface or a 2D/3D identifying signal extracted from an input image signal data-in, and thus the gate driver 140 and the data driver 150 are driven in the 2D mode or the 3D mode.

The controller 170 receives the input image signal data-in and various control signals O-CS from an external graphic controller (not shown). The controller 170 divides the input image signal data-in into a first image data data-1 and a second image data data-2, which have different gray scale values from each other. In addition, the controller 170 receives the various control signals O-CS, such as a vertical synchronizing signal, a horizontal synchronizing signal, a main clock, a data enable signal, etc., to output first, second, and third control signals CT1, CT2, and CT3.

The first control signal CT1 is applied to the gate driver 140 to control the operation of the gate driver 140. The first control signal CT1 includes a vertical start signal starting the operation of the gate driver 140, a gate clock signal deciding an output timing of the gate voltage, and an output enable signal determining an on-pulse width of the gate voltage.

In addition, the second control signal CT2 is applied to the data driver 150 to control the operation of the data driver 150. The second control signal CT2 includes a horizontal is start signal starting the operation of the data driver 150, an inverting signal inverting a polarity of the first and second data voltages DV1 and DV2, and an output indicating signal deciding an output timing of the first and second data voltages DV1 and DV2 from the data driver 150.

The gamma reference voltage generator 160 receives a power voltage and generates a gamma reference voltage $V_{GMMA}$ in response to the third control signal CT3 from the controller 170.

The gate driver 140 sequentially applies the gate voltage to the gate lines GL1 to GLn in response to the first control signal CT1.

The data driver 150 receives the first image data data-1 and the second image data data-2 from the controller 170. In addition, the data driver 150 converts the first image data data-1 into the first data voltage DV1 and the second image data data-2 into the second data voltage DV2 based on the gamma reference voltage $V_{GMMA}$ from the gamma reference voltage generator 160.

The gate voltage is applied to the first gate line GL1, the first data voltage DV1 is applied to the first data line DL1, and the second data voltage DV2 is applied to the second data line DL2. When the gate voltage is applied to the first gate line GL1, the first and second thin film transistors TFT1 and TFT2 are turned on in response to the gate voltage to respectively output the first data voltage DV1 from the first data line DL1 and the second data voltage DV2 from the second data line DL2. Thus, the first sub-pixel electrode SPE1 is charged with the first data voltage DV1 and the second sub-pixel electrode SPE2 is charged with the second data voltage DV2.

As described above, since the first sub-pixel electrode SPE1 has an area smaller than an area of the second sub-pixel electrode SPE2, the first image data data-1 has a gray scale is value higher than that of the second image data data-2. Accordingly, the first data voltage DV1 has a voltage level higher than a voltage level of the second data voltage DV2.

FIG. 6 shows the gray scale versus the brightness in the first sub-pixel electrode SPE1 and the second sub-pixel electrode SPE2 during the 2D mode. In this case, the second sub-pixel electrode SPE2 has an area two times larger than the area of the first sub-pixel electrode SPE1.

In FIG. 6, a first graph G1 shows a gamma curve of the first image data data-1, a second graph G2 shows a gamma curve of the second image data data-2, and a third graph G3 shows a gamma curve of the input image signal data-in.

As shown in FIG. 6, the first and second graphs G1 and G2 have different gray scale values, and thus the first and second graphs G1 and G2 show different brightness levels at the same gray scale. The third graph G3 shows the brightness level of the first and second graphs G1 and G2 according to the gray scale. Accordingly, the brightness level Max-Px of the third graph G3 at the maximum gray scale K is two times greater than the brightness level Max-Spx of the first and second graphs G1 and G2 at the maximum gray scale K. In addition, the third graph G3 shows a gamma value of about 2.2.

In addition, a graph showing a relation between the gray scale and the first data voltage DV1 is the same as the first graph G1, and a graph showing a relation between the gray scale and the second data voltage DV2 is the same as the second graph G2. Accordingly, the first data voltage DV1 has a voltage level higher than that of the second data voltage DV2 at the same gray scale.

Thus, when the first and second data voltages DV1 and DV2 are applied to the first and second sub-pixel electrodes SPE1 and SPE2, respectively, different brightness levels are is represented at the same gray scale. That is, the brightness level of the first sub-pixel electrode SPE1 is higher than the brightness level of the second sub-pixel electrode SPE2 at the same gray scale, thereby improving the viewing angle of the 2D image displayed in the 2D mode.

Hereinafter, the operation of the display apparatus in the 3D mode will be described in detail with reference to FIGS. 3 and 7. In the exemplary embodiment, the left-eye data voltage DVL is applied to the first sub-pixel electrode SPE1 and the right-eye data voltage DVR is applied to the second sub-electrode SPE2.

The controller 170 receives the input image signal data-in from the external graphic controller (not shown) to divide the input image signal data-in into a left-eye image data data-L and a right-eye image data data-R.

Accordingly, the second control signal CT2 includes the horizontal start signal, an inverting signal inverting a polarity of the left- and right-eye data voltages DVL and DVR, and an output indicating signal deciding an output timing of the left- and right-eye data voltages DVL and DVR from the data driver 150.

The data driver 150 receives the left-eye image data data-L and the right-eye image data data-R. In addition, the data driver 150 converts the left-eye image data data-L into the left-eye data voltage DVL and the right-eye image data data-R into the right-eye data voltage DVR based on the gamma reference voltage $V_{GMMA}$ from the gamma reference voltage generator 160.

The gate voltage is applied to the first gate line GL1, and the left-eye and right-eye data voltages DVL and DVR are respectively applied to the first and second data lines DL1 and DL2. When the gate voltage is applied to the first gate line GL1, the first and second thin film transistors TFT1 and TFT2 are turned on, the left-eye data voltage DVL applied to the first is data line DL1 is provided to the first sub-pixel electrode SPE1 through the turned-on first thin film transistor TFT1 and the right-eye data voltage DVR applied to the second data line DL2 is provided to the second sub-pixel electrode SPE2 through the turned-on second thin film transistor TFT2. Therefore, the first sub-pixel electrode SPE1 displays the left-eye image and the second sub-pixel electrode SPE2 displays the right-eye image.

The left-eye image data data-L and the right-eye image data data-R have a gamma curve of the same gamma value. In the present exemplary embodiment, the gamma value is about 2.2. Meanwhile, in the case that the first and second sub-pixel electrodes SPE1 and SPE2 having the different areas from each other respectively display the left- and right-eye images in the same brightness level, a difference in brightness occurs between the left-eye image and the right-eye image due to the difference in area between the first and second sub-pixel electrodes SPE1 and SPE2. In detail, when the area of the first sub-pixel electrode SPE1 is smaller than the area of the second sub-pixel electrode SPE2, the left-eye image is darker than the right-eye image.

In the present exemplary embodiment, the left-eye image and the right-eye image may be provided to have the same brightness level by controlling the voltage level of the left-eye data voltage DVL and the right-eye data voltage DVR.

In FIG. 8, a fourth graph G4 shows a gamma curve of the left-eye image data data-L and a fifth graph G5 shows a gamma curve of the right-eye image data data-R. The fourth graph G4 and the fifth graph G5 have the same gamma value.

In order to match the brightness level of the left-eye image with the brightness level of the right-eye image, the brightness level of the right-eye image is reduced. As shown in FIG. 8, the brightness level according to the fifth graph G5 is lower than the brightness level is according to the fourth graph G4 at the same gray scale. For instance, when the area of the first sub-pixel electrode SPE1 is a half of the area of the second sub-pixel electrode SPE2, the brightness level M-Spx2 of the fifth graph G5 at the maximum gray scale K is a half of the brightness level M-Spx1 of the fourth graph G4 at the maximum gray scale K.

The voltage level of the right-eye data voltage DVR generated based on the right-eye image data data-R is lower than the voltage level of the left-eye data voltage DVL generated based on the left-eye image data data-L. For example, when the area of the first sub-pixel electrode SPE1 is half of the area of the second sub-pixel electrode SPE2, the voltage level of the left-eye data voltage DVL may be twice that of the voltage level of the right-eye data voltage DVR.

Figure 9:
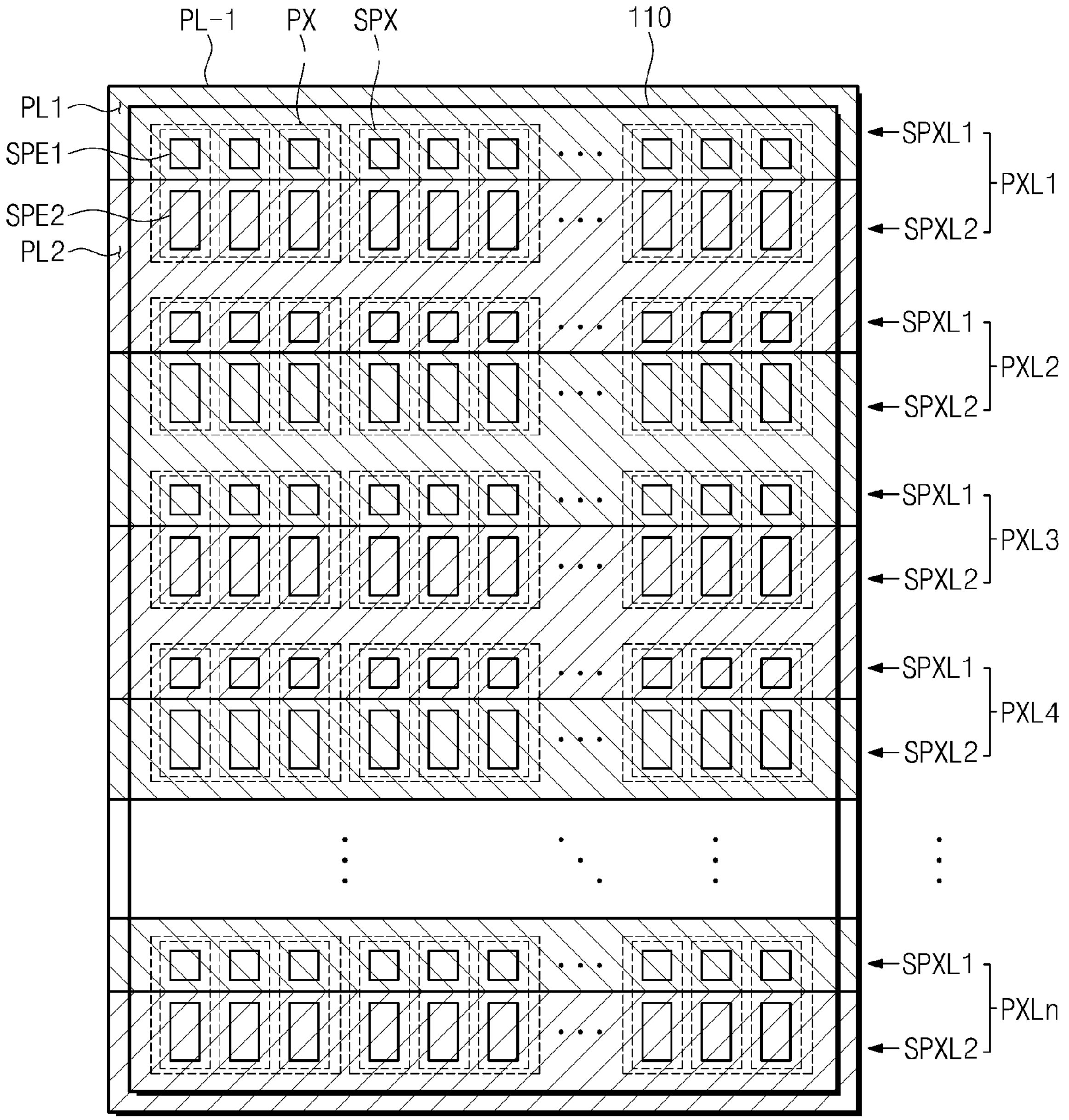
FIG. 9 is a view showing an arrangement relation between a first substrate and a patterned retarder according to another exemplary embodiment of the present invention.
Figure 10:
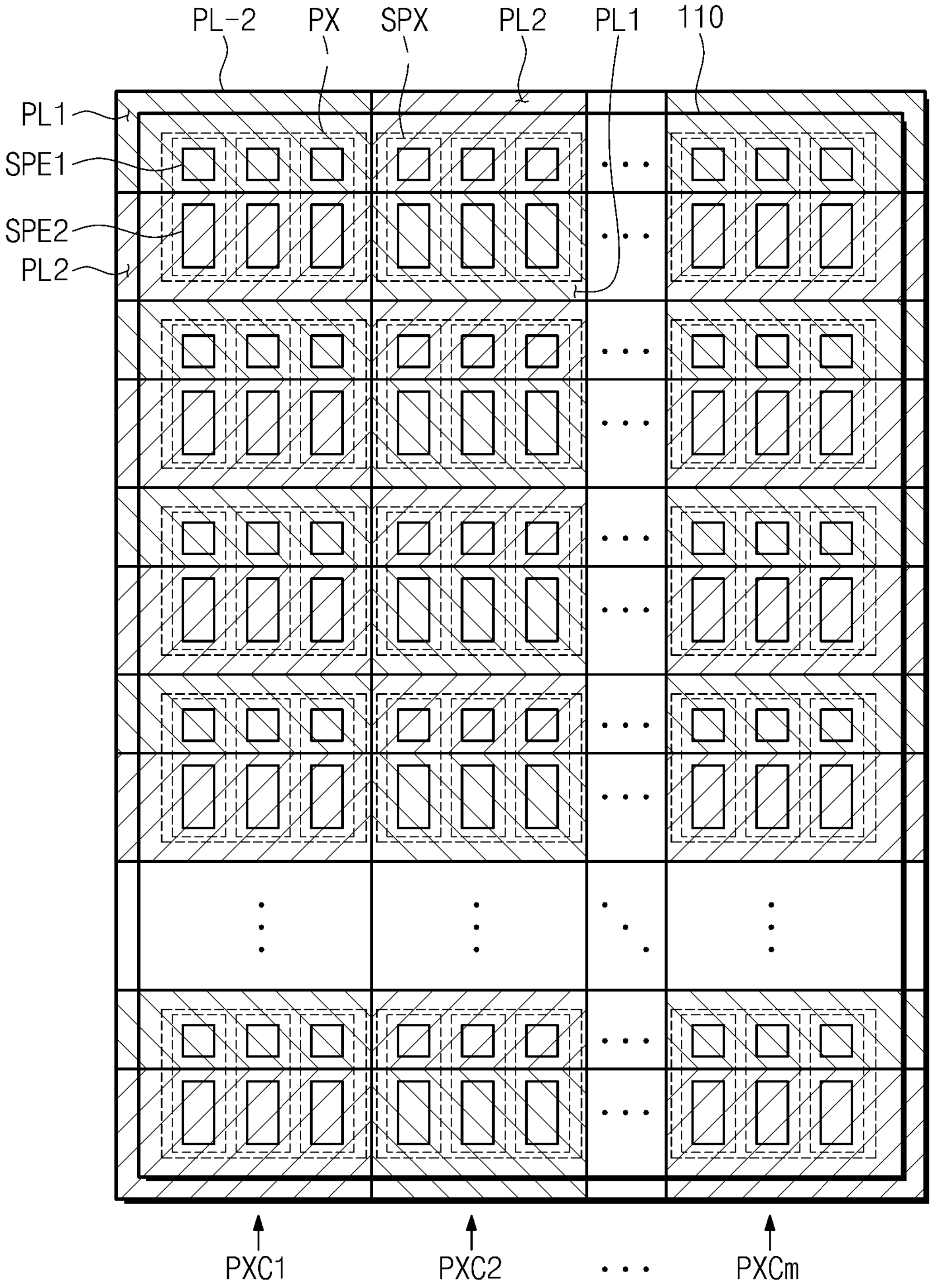
FIG. 10 is a view showing an arrangement relation between a first substrate and a patterned retarder according to another exemplary embodiment of the present invention.

FIG. 9 is a view showing an arrangement relation between a first substrate and a patterned retarder according to another exemplary embodiment of the present invention, and FIG. 10 is a view showing an arrangement relation between a first substrate and a patterned retarder according to still another exemplary embodiment of the present invention. In FIGS. 9 and 10, the same reference numerals denote the same elements in FIGS. 1 to 8, and thus detailed descriptions of the same elements will be omitted.

Referring to FIG. 9, the first retarders PL1 are disposed corresponding to the first sub-pixel row SPXL1 included in a k-th pixel row (k is an odd number lower than N) and the second sub-pixel row SPXL2 included in a (k+1)th pixel row among the N pixel rows PXL1 to PXLn. The second retarders PL2 are disposed corresponding to the second sub-pixel row SPXL2 included in the k-th pixel row and the first sub-pixel row SPXL1 included in the (k+1)th pixel row among the N pixel rows PXL1 to PXLn.

In detail, the first retarder PL1 is disposed corresponding to the first sub-pixel row SPXL1 included in the first pixel row PXL1 and the second sub-pixel row SPXL2 included in the second pixel row PXL2, and the second retarder PL2 is disposed corresponding to the second sub-pixel row SPXL2 included in the first pixel row PXL1 and the first sub-pixel row SPXL1 included in the second pixel row PXL2.

The left-eye data voltage DVL is applied to first sub-pixel electrodes SPE1 arranged in the first sub-pixel row SPXL1 of the first pixel row PXL1 and to the second sub-pixel electrodes SPE2 arranged in the second sub-pixel row SPXL2 of the second pixel row PXL2. In addition, the right-eye data voltage DVR is applied to the second sub-pixel electrodes SPE2 arranged in the second sub-pixel row SPXL2 of the first pixel row PXL1 and to the first sub-pixel electrodes SPE1 arranged in the first sub-pixel row SPXL1 of the second pixel row PXL2.

Different from the display apparatus shown in FIGS. 1 to 8, the display apparatus in the present exemplary embodiment displays the left-eye image and the right-eye image in a unit of two rows, which are adjacent to each other but arranged in different rows, except for the first sub-pixel row SPXL1 included in the first pixel row and the second sub-pixel row SPXL2 included in the N-th pixel row PXLn.

Accordingly, the repeated number of the first retarders PL1 and the second retarders PL2 in the patterned retarder PL-1 shown in FIG. 9 may be reduced by nearly half when compared to the patterned retarder PL shown in FIG. 4. As a result, the patterned retarder PL-1 may be easily manufactured and a manufacturing cost of the display apparatus may be reduced.

Referring to FIG. 10, the first retarders PL1 are disposed corresponding to the first sub-pixel electrode SPE1 of the sub-pixel SPX included in a r-th pixel column (r is an odd is number lower than M) and the second sub-pixel electrode SPE2 of the sub-pixel SPX included in a (r+1)th pixel column among the M pixel columns PXC1 to PXCn. In addition, the second retarders PL2 are disposed corresponding to the second sub-pixel electrode SPE2 of the sub-pixel SPX included in the r-th pixel column and the first sub-pixel electrode SPE1 of the sub-pixel SPX included in the (r+1)th pixel column among the M pixel columns PXC1 to PXCn.

In detail, the first retarder PL1 of the patterned retarder PL-2 is disposed corresponding to the first sub-pixel electrodes SPE1 included in the first pixel column PXC1 and the second sub-pixel electrodes SPE2 included in the second pixel column PXC2, and the second retarder PL2 of the patterned retarder PL-2 is disposed corresponding to the second sub-pixel electrodes SPE2 included in the first pixel column PXC1 and the first sub-pixel electrodes SPE1 included in the second pixel column PXC2.

The left-eye data voltage DVL is applied to first sub-pixel electrodes SPE1 arranged in the first pixel column PXC1 and to the second sub-pixel electrodes SPE2 arranged in the second pixel column PXC2. In addition, the right-eye data voltage DVR is applied to the second sub-pixel electrodes SPE2 arranged in the first pixel column PXC1 and to the first sub-pixel electrodes SPE1 arranged in the second pixel column PXC2.

Figure 11:
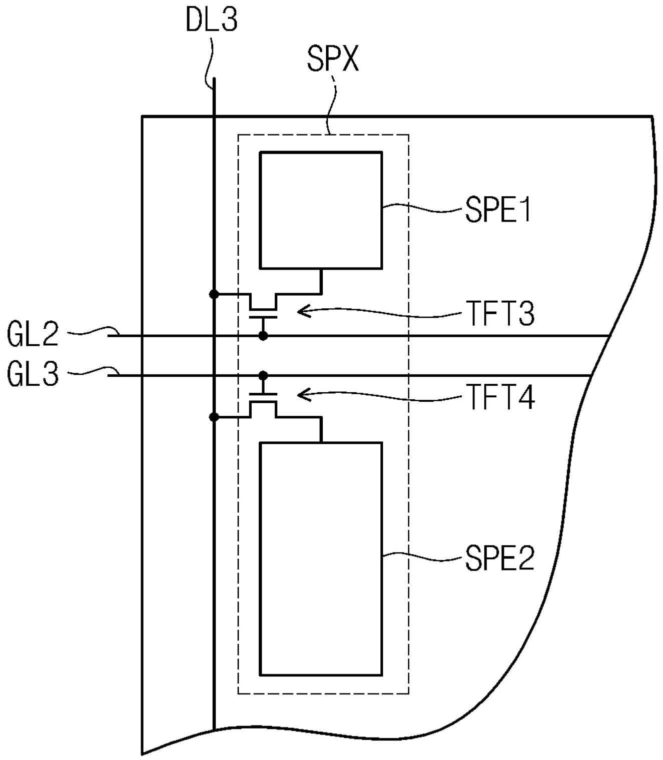
FIG. 11 is a plan view showing a first substrate according to another exemplary embodiment of the present invention.

FIG. 11 is a plan view showing a first substrate according to another exemplary embodiment of the present invention. In FIG. 11, one sub-pixel SPX has been shown, but the sub-pixel included in each pixel PX may have the same configuration as the one sub-pixel SPX shown in FIG. 11.

In the present exemplary embodiment, a display apparatus includes a first substrate 110 on which gate lines GL1 to GLn and data lines DL1 to DLm are disposed, a second substrate 120, a liquid crystal layer 130 disposed between the first substrate 110 and the second is substrate 120.

The gate lines GL1 to GLn include a second gate line GL2 and a third gate line GL3 substantially parallel to and electrically insulated from the second gate line GL2. The data lines DL1 to DLm include a third data line DL3 insulated from the second and third gate lines GL2 and GL3 while crossing the second and third gate lines GL2 and GL3.

The sub-pixel SPX includes a third thin film transistor TFT3 connected to the second gate line GL2 and the third data line DL3, the first sub-pixel electrode SPE1 connected to the third thin film transistor TFT3, a fourth thin film transistor TFT4 connected to the third gate line GL3 and the third data line DL3, and the second sub-pixel electrode SPE2 connected to the fourth thin film transistor TFT4. The first and second sub-pixel electrodes SPE1 and SPE2 may be individually driven by the third and fourth thin film transistors TFT3 and TFT4.

In the 2D mode, in a 1H time period in which the sub-pixel SPX is driven, a first gate voltage, which maintains a high state in an earlier H/2 time period during which the first sub-pixel electrode SPE1 is driven, is applied to the second gate line GL2. In addition, in the 1H time period, a second gate voltage, which maintains the high state in a later H/2 time period during which the second sub-pixel electrode SPE2 is driven, is applied to the third gate line GL3. The third data line DL3 is applied with the first data voltage DV1 during the earlier H/2 time period and with the second data voltage DV2 during the later H/2 time period.

Thus, the third thin film transistor TFT3 outputs the first data voltage DV1 applied through the third data line DL3 during the earlier H/2 time period in response to the first gate voltage. Then, the fourth thin film transistor TFT4 outputs the second data voltage DV2 applied through the third data line DL3 during the later H/2 time period in response to the second gate voltage. Consequently, the first sub-pixel electrode SPE1 is charged with the first data is voltage DV1 and the second sub-pixel electrode SPE2 is charged with the second data voltage DV2.

In the 3D mode, the left-eye data voltage DVL and the right-eye data voltage DVR are respectively applied to the first sub-pixel electrode SPE1 and the second sub-pixel electrode SPE2, as described in the 2D mode.

Figure 12:
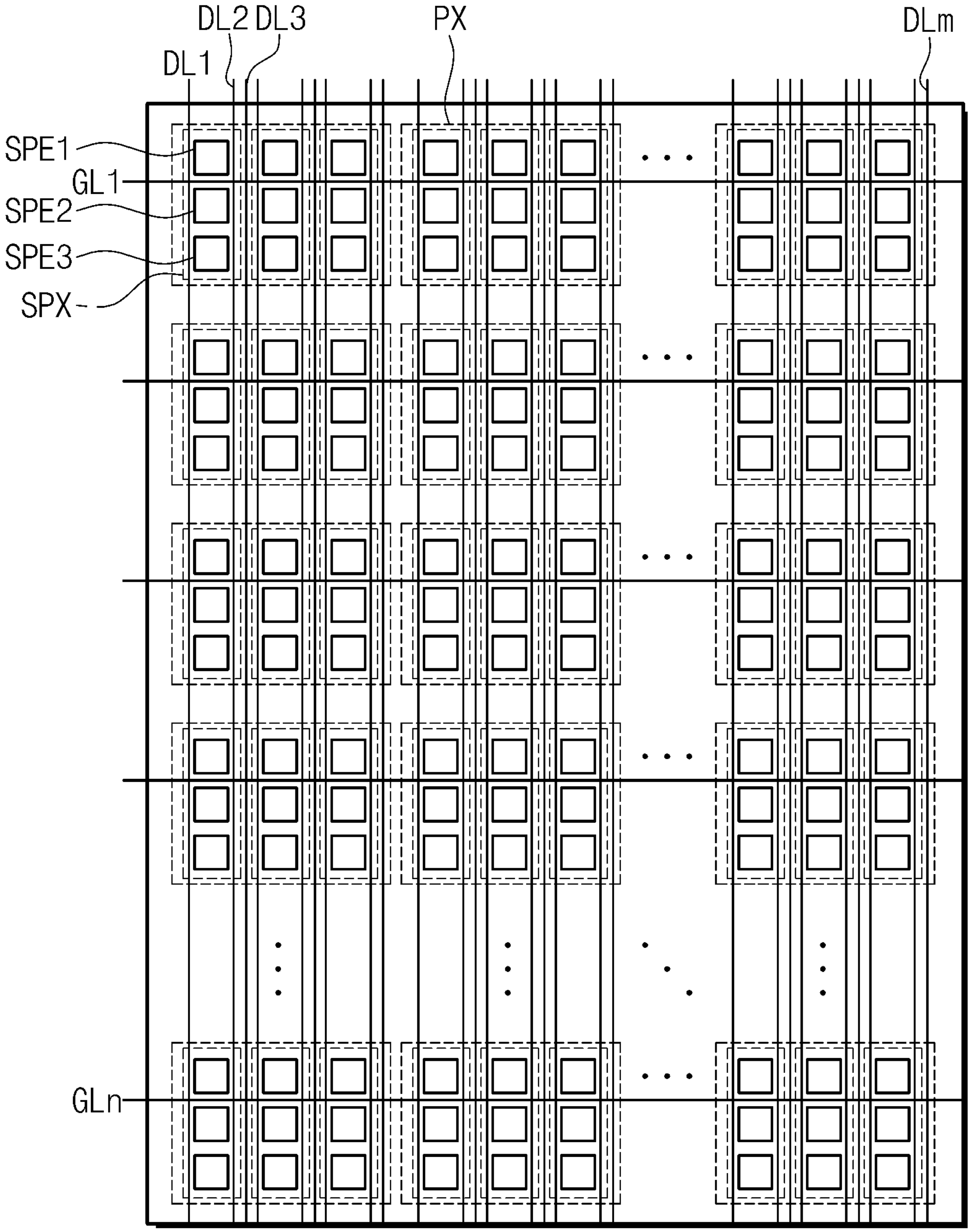
FIG. 12 is a plan view showing a first substrate according to another exemplary is embodiment of the present invention.
Figure 13:
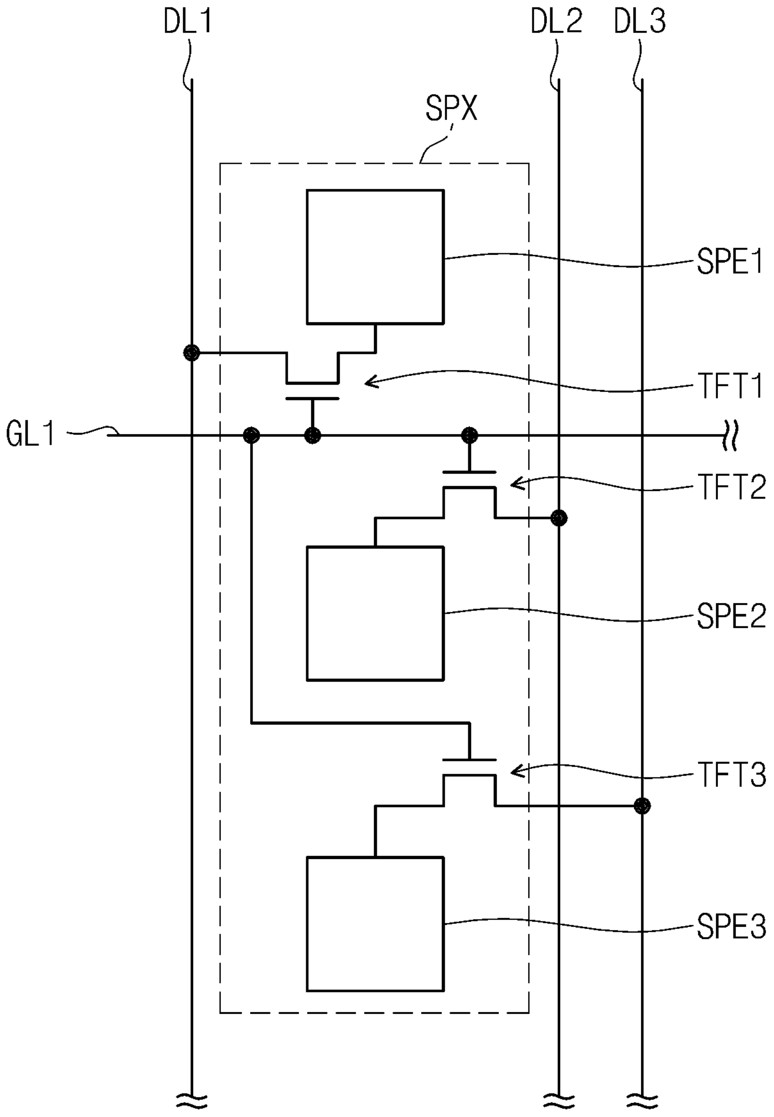
FIG. 13 is a partially enlarged view showing a sub-pixel shown in FIG. 12.
Figure 14:
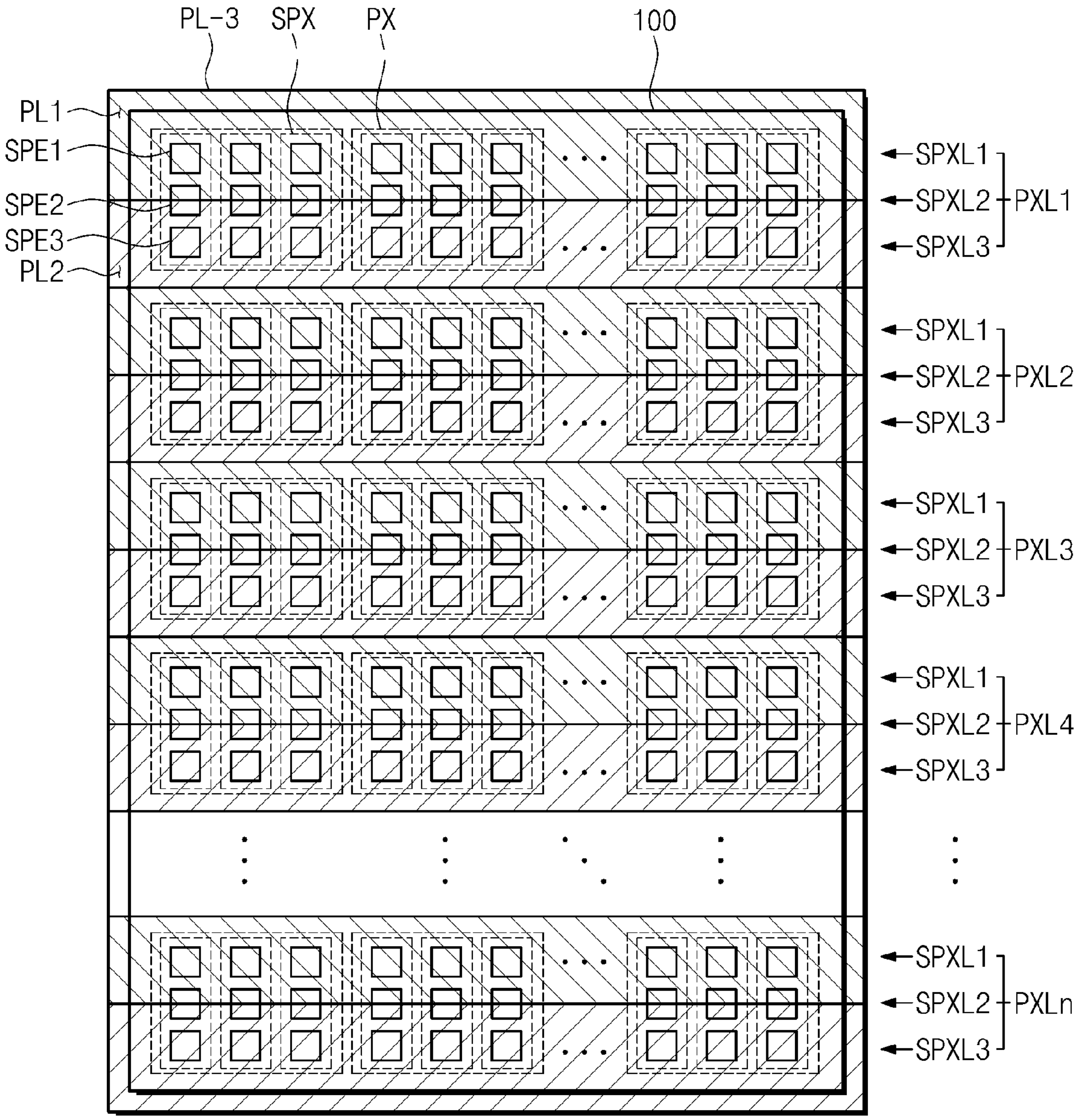
FIG. 14 is a view showing an arrangement relation between a first substrate shown in FIG. 12 and a patterned retarder.
Figure 15:
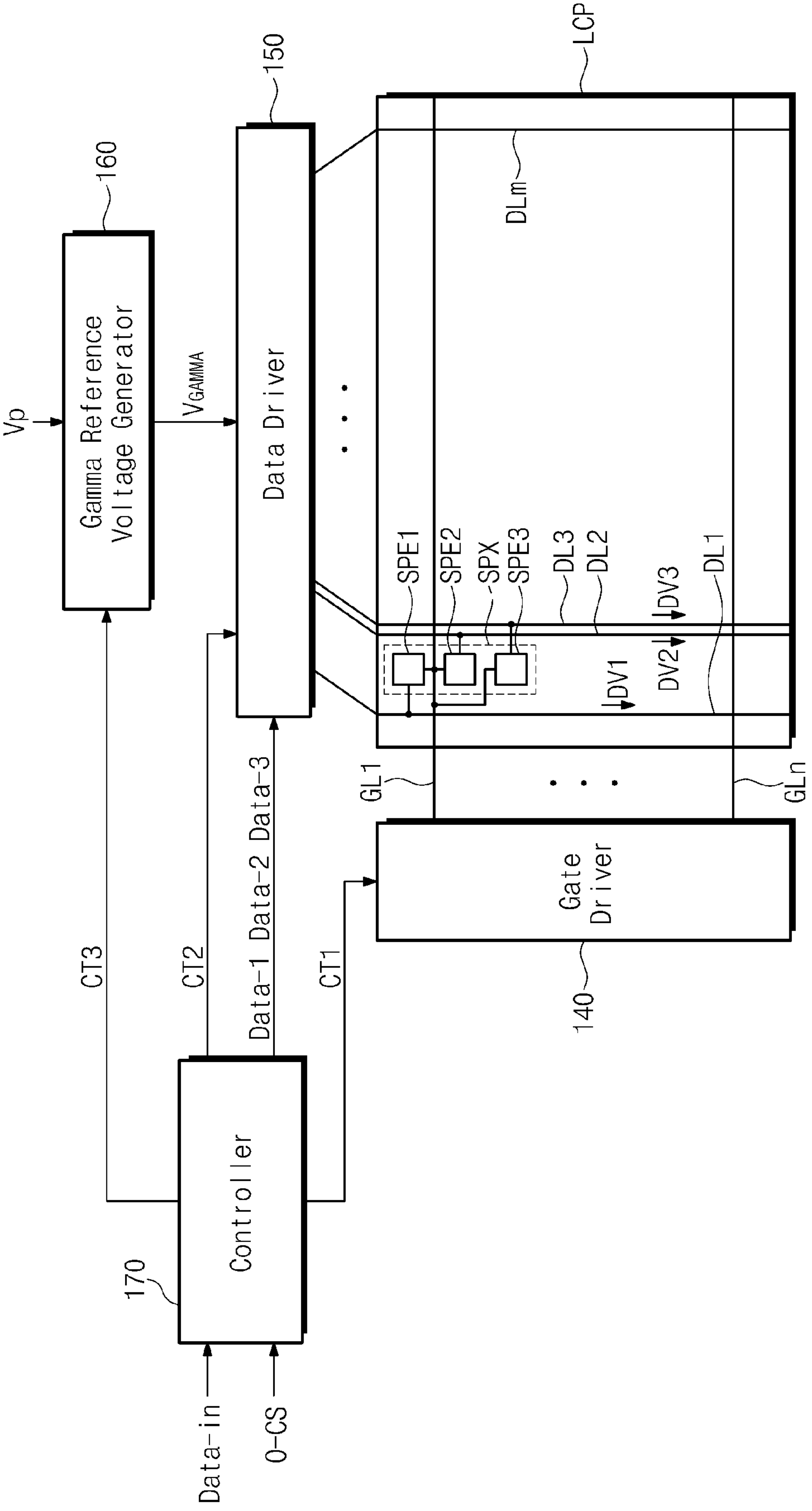
FIG. 15 is a block diagram showing a display panel when the display apparatus shown in FIG. 12 is driven in a 2D mode.
Figure 16:
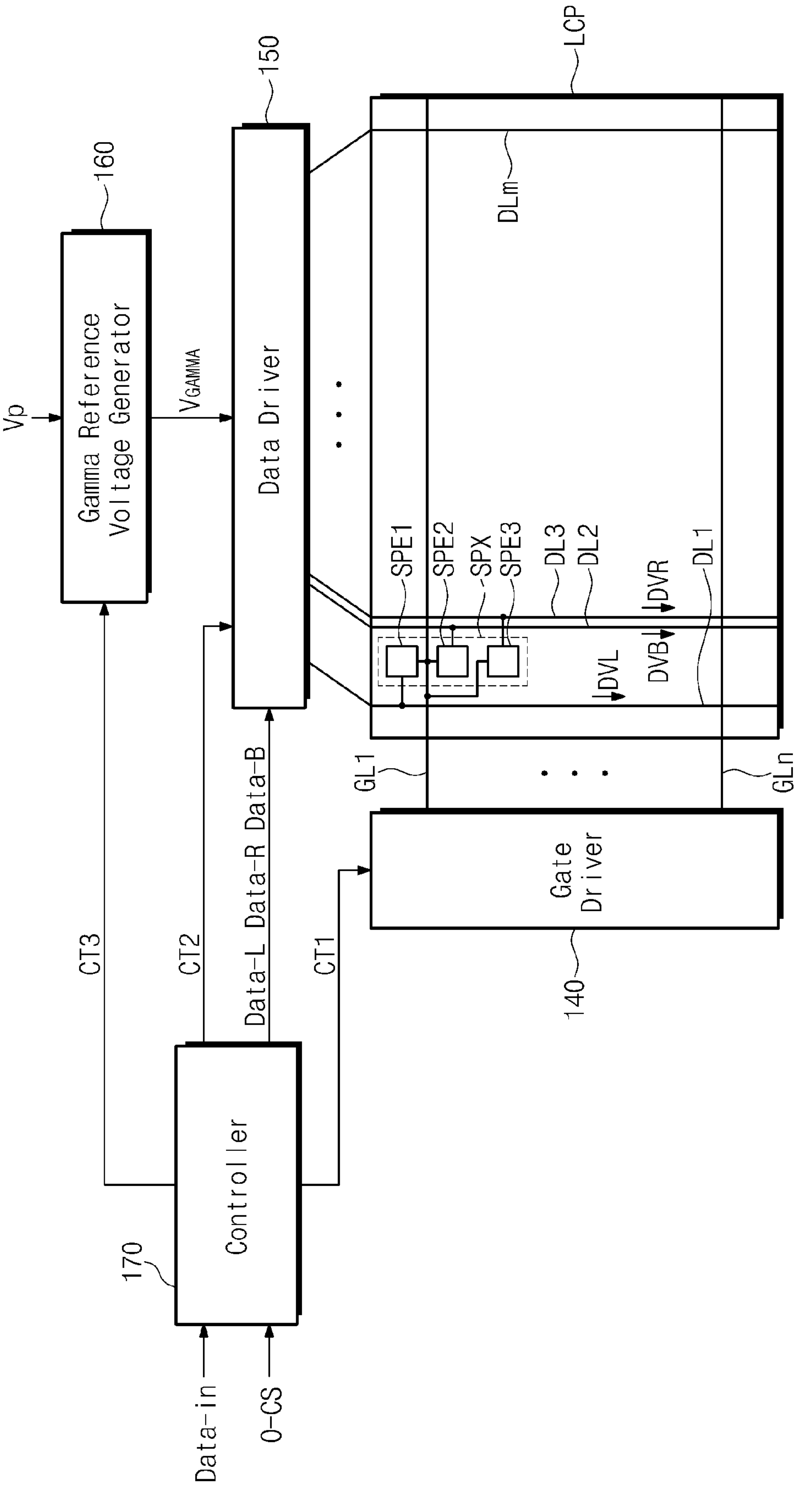
FIG. 16 is a block diagram showing a display panel when the display apparatus shown in FIG. 12 is driven in a 3D mode.

FIG. 12 is a plan view showing a first substrate according to another exemplary embodiment of the present invention. FIG. 13 is a partially enlarged view showing a sub-pixel shown in FIG. 12. FIG. 14 is a view showing an arrangement relation between a first substrate shown in FIG. 12 and a patterned retarder. FIG. 15 is a block diagram showing a display panel when the display apparatus shown in FIG. 12 is driven in a 2D mode and FIG. 16 is a block diagram showing a display panel when the display apparatus shown in FIG. 12 is driven in a 3D mode. In FIGS. 12 to 16, the same reference numerals denote the same elements in FIGS. 1 to 11, and thus detailed descriptions of the same elements will be omitted.

As show in FIGS. 12 to 16, the display apparatus includes a liquid crystal display panel LCP, a driving circuit, and a patterned retarder PL-3.

The liquid crystal display panel LCP includes a plurality of pixels PX, each having at least one sub-pixel SPX, and the pixels PX are disposed on a first substrate 110. A plurality of gate lines GL1 to GLn and a plurality of data lines DL1 to DLm are disposed on the first substrate 110. The gate lines GL1 to GLn are extended in a row direction and arranged in a column direction, and the data lines DL1 to DLm are extended in the column direction and arranged in the row direction. The data lines DL1 to DLm are insulated from the gate lines GL1 to GLn while crossing the gate lines GL1 to GLn.

As shown in FIG. 12, the pixels PX may be arranged in an N rows by M columns matrix, where N and M are each a natural number greater than 1. In the present exemplary embodiment, each of the pixels PX may include three sub-pixels SPX and the three sub-pixels SPX may be arranged in the row direction.

Each of the sub-pixels SPX includes a first sub-pixel electrode SPE1, a second sub-pixel electrode SPE2, and a third sub-pixel electrode SPE3. The first, second, and third sub-pixel electrodes SPE1, SPE2, and SPE3 in each sub-pixel SPX may be arranged in the column direction. The first, second, and third sub-pixel electrodes SPE1, SPE2, and SPE3 have the same area. In addition, the first, second, and third sub-pixel electrodes SPE1, SPE2, and SPE3 are individually driven.

Hereinafter, the sub-pixels SPX will be described in detail with reference to FIG. 13. In the present exemplary embodiment, the sub-pixels SPX have the same structure and function, and thus one sub-pixel SPX will be described as a representative example.

Each sub-pixel SPX includes first, second, and third thin film transistors TFT1, TFT2, and TFT3 to switch a pixel voltage applied to the first, second, and third sub-pixel electrodes SPE1, SPE2, and SPE3, respectively. Each of the first, second, and third thin film transistors TFT1, TFT2, and TFT3 includes a gate electrode, an active layer, a source electrode, and a drain electrode.

The gate lines GL1 to GLn include a first gate line GL1. The data lines DL1 to DLm include a first data line DL1 insulated from the first gate line GL1 while crossing the first gate line GL1, a second data line DL2 insulated from the first gate line GL1 while crossing the first gate line GL1 and substantially parallel to the first data line DL1 to be electrically insulated from the first data line DL1, and a third data line DL3 substantially parallel to the first and second data lines DL1 and DL2 and electrically insulated from the first and second data lines DL1 and DL2.

The first thin film transistor TFT1 is connected to the first gate line GL1, the first data line DL1, and the first sub-pixel electrode SPE1. The second thin film transistor TFT2 is connected to the first gate line GL1, the second data line DL2, and the second sub-pixel electrode SPE2, and the third thin film transistor TFT3 is connected to the first gate line GL1, the third data line DL3, and the third sub-pixel electrode SPE3.

Referring to FIG. 14, the patterned retarder PL-3 is disposed on the liquid crystal display panel LCP and includes a plurality of first retarders PL1 and a plurality of second retarders PL2 having a transmission axis different from that of the first retarders PL1.

Each of the first retarders PL1 is disposed corresponding to one of the first sub-pixel electrode SPE1 and the third sub-pixel electrode SPE3 and each of the second retarders PL2 is disposed corresponding to the other one of the first sub-pixel electrode SPE1 and the third sub-pixel electrode SPE3. For instance, the first retarder PL1 may be disposed corresponding to the first sub-pixel electrode SPE1 and the second retarder PL2 may be disposed corresponding to the third sub-pixel electrode SPE3.

Meanwhile, each of the N pixel rows PXL1 to PXLn includes a first sub-pixel row SPXL1, a second sub-pixel row SPXL2, and a third sub-pixel row SPXL3, which are arranged in the column direction. The first sub-pixel electrode SPE1 is arranged in the first sub-pixel row SPXL1, the second sub-pixel electrode SPE2 is arranged in the second sub-pixel row SPXL2, and the third sub-pixel electrode SPE3 is arranged in the third sub-pixel row SPXL3. The first, second, and third sub-pixel electrodes SPE1, SPE2, and SPE3 have the same arrangement between the sub-pixels SPX included in the pixel rows PXL1 to PXLn.

The first retarder PL1 may be disposed corresponding to the first sub-pixel row SPXL1 and the second retarder PL2 may be disposed corresponding to the third sub-pixel row SPXL3.

In addition, the first retarder PL1 is extended to correspond to at least a portion of the second sub-pixel row SPXL2 and the second retarder PL2 is extended to correspond to a remaining portion of the second sub-pixel row SPXL2. Thus, the first retarder PL1 and the second retarder PL2 may be disposed to correspond to one pixel row, and the first retarder PL1 and the second retarder PL2 are adjacent to each other in the area corresponding to the second sub-pixel row SPXL2.

For example, when the pixels PX are arranged in 1080 rows by 1920 columns, the patterned retarder PL-3 includes 1080 (one thousand eighty) first retarders PL1 corresponding to the first sub-pixel rows SPXL1 and 1080 (one thousand eighty) second retarders PL2 corresponding to the third sub-pixel rows SPXL3.

The display apparatus includes the driving circuit driving circuit applying different data voltages to the liquid crystal display panel LCP in the 2D mode and the 3D mode.

The driving circuit applies a first data voltage DV1, a second data voltage DV2, and a third data voltage DV3, which have different voltage levels from each other, to the liquid crystal display panel LCP in the 2D mode. Particularly, the first data voltage DV1, the second data voltage DV2, and the third data voltage DV3 are applied to the first sub-pixel electrode SPE1, the second sub-pixel electrode SPE2, and the third sub-pixel electrode SPE3, respectively.

In addition, the driving circuit applies a left-eye data voltage DVL according to a left-eye image and a right-eye data voltage DVR according to a right-eye image to the liquid crystal display panel LCP in the 3D mode, and applies a black gray scale voltage corresponding to a black gray scale to the liquid crystal display panel LCP. When the left-eye data voltage DVL is applied to the first sub-pixel electrode SPE1, the right-eye data voltage DVR is applied to the third sub-pixel electrode SPE3 and the black gray scale voltage is applied to the second sub-pixel electrode SPE2. That is, in the case where the first, second, and third sub-pixel electrodes SPE1, SPE2, and SPE3 are sequentially successively arranged, the black gray scale voltage is applied to the second sub-pixel electrode SPE2 disposed between the first and third sub-pixel electrodes SPE1 and SPE3. As described above, since the image having the black gray scale is displayed between the left-eye image and the right-eye image, a cross-talk phenomenon may be prevented.

Hereinafter, the operation of the display apparatus in the 2D mode will be described in detail with reference to FIG. 15.

The driving circuit includes a gate driver 140, a data driver 150, a gamma reference voltage generator 160, and a controller 170.

The controller 170 receives an input image signal data-in and various control signals O-CS from an external graphic controller (not shown). The controller 170 generates a first image data data-1, a second image data data-2, and a third image data data-3 based on the input image signal data-in. The first, second, and third image data data-1, data-2, and data-3 have different gray scale values. In addition, the controller 170 receives the various control signals O-CS, such as a vertical synchronizing signal, a horizontal synchronizing signal, a main clock, a data enable signal, etc., to output first, second, and third control signals CT1, CT2, and CT3.

The first control signal CT1 is applied to the gate driver 140 to control the driving of the gate driver 140. The first control signal CT1 includes a vertical start signal starting the driving of the gate driver 140, a gate clock signal deciding an output timing of the gate voltage, and an output enable signal deciding an on-pulse width of the gate voltage.

In addition, the second control signal CT2 is applied to the data driver 150 to control the driving of the data driver 150. The second control signal CT2 includes a horizontal start signal starting the driving of the data driver 150, an inverting signal inverting a polarity of the first, second, and third data voltages DV1, DV2, and DV3, and an output indicating signal deciding an output timing of the first, second, third data voltages DV1, DV2, and DV3 from the data driver 150.

The gamma reference voltage generator 160 receives a power voltage and generates a gamma reference voltage $V_{GMMA}$ in response to the third control signal CT3 from the controller 170.

The gate driver 140 sequentially applies the gate voltage to the gate lines GL1 to GLn in response to the first control signal CT1.

The data driver 150 receives the first image data data-1, the second image data data-2, and the third image data data-3. In addition, the data driver 150 converts the first image data data-1 into the first data voltage DV1, the second image data data-2 into the second data voltage DV2, and the third image data data-3 into the third data voltage DV3 based on the gamma reference voltage $V_{GMMA}$ from the gamma reference voltage generator 160.

When the gate voltage is applied to the first gate line GL1, the first, second, and third thin film transistors TFT1, TFT2, and TFT3 are substantially simultaneously turned on. The first, second, and third data voltages DV1, DV2, and EV3 applied to the first, second, and third data lines DL1, DL2, and DL3, respectively, are directed to the first, second, and third sub-pixel electrodes SPE1, SPE2, and SPE3, respectively, through the turned-on first, second, and third thin film transistors TFT1, TFT2, and TFT3.

As described above, since the first, second, and third image data data-1, data-2, and data-3 have the different gray scale values from each other, the first, second, and third data voltages DV1, DV2, and DV3 have different voltage levels from each other.

Hereinafter, the operation of the display apparatus in 3D mode will be described in detail with reference to FIG. 16.

The controller 170 receives an input image signal data-in from an external graphic controller (not shown) and generates a left-eye image data data-L and a right-image data data-R based on the input image signal data-in. In addition, the controller 170 outputs a black gray scale data data-B between the left-eye image data data-L and the right-eye image data data-R.

The data driver 150 receives the left-eye image data data-L, the right-eye image data data-R, and the black gray scale data data-B from the controller 170. In addition, the data driver 150 converts the left-eye image data data-L into the left-eye data voltage DVL and the right-eye image data data-R into the right-eye data voltage DVR based on the gamma reference voltage $V_{GMMA}$ from the gamma reference voltage generator 160. The data driver 150 converts the black gray scale data data-B into the black gray scale voltage DVB.

The first gate line GL1 receives the gate voltage, the first and third data lines DL1 and DL3 receives the left- and right-eye data voltages DVL and DVR, and the second data line DL2 receives the black gray scale voltage DVB. When the first, second, third thin film transistors TFT1, TFT2, and TFT3 are turned on in response to the gate voltage, the first sub-pixel electrode SPE1 receives the left-eye data voltage DVL, the third sub-pixel electrode SPE3 receives the right-eye data voltage DVR, and the second sub-pixel electrode SPE2 receives the black gray scale voltage DVB. Thus, the sub-pixel SPX may display the left-eye image and the right-eye image and display the black gray scale image between the left-eye image and the right-eye image. As a result, the cross-talk phenomenon between the left-eye and the right-eye may be prevented.

Figure 17:
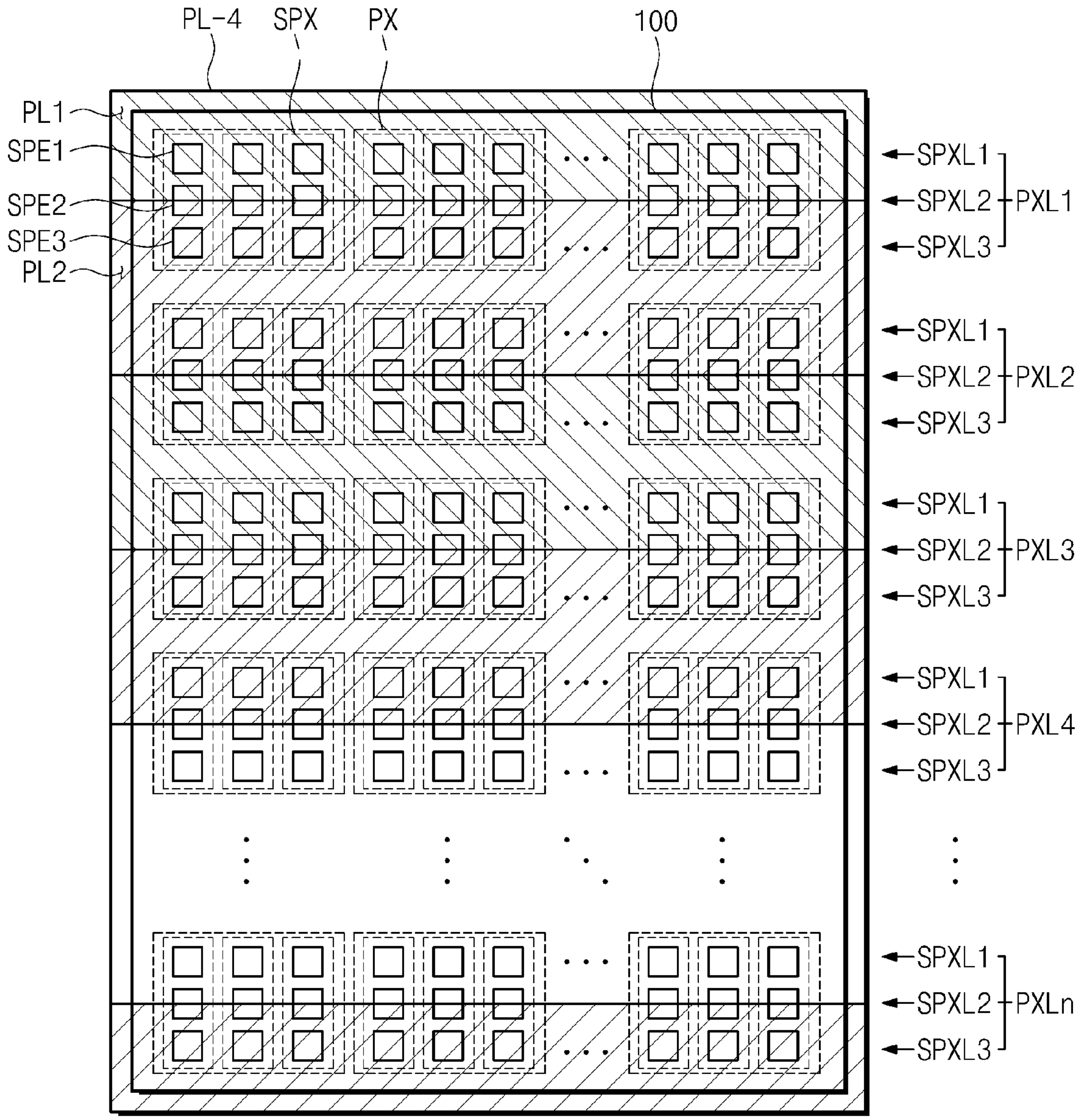
FIG. 17 is a view showing an arrangement relation between a first substrate and a patterned retarder according to another exemplary embodiment of the present invention.

FIG. 17 is a view showing an arrangement relation between a first substrate and a patterned retarder PL-4 according to another exemplary embodiment of the present invention. In FIG. 17, the same reference numerals denote the same elements in FIGS. 12 to 16, and thus detailed descriptions of the same elements will be omitted.

The first retarders PL1 are disposed corresponding to the first sub-pixel row SPXL1 included in a k-th pixel row (k is an odd number lower than N) and the third sub-pixel row SPXL3 included in a (k+1)th pixel row among the N pixel rows PXL1 to PXLn. The second retarders PL2 are disposed corresponding to the third sub-pixel row SPXL3 included in the k-th pixel row and the first sub-pixel row SPXL1 included in the (k+1)th pixel row among the N pixel rows PXL1 to PXLn.

In detail, the first retarder PL1 is disposed corresponding to the first sub-pixel row SPXL1 included in the first pixel row PXL1 and the third sub-pixel row SPXL3 included in the second pixel row PXL2, and the second retarder PL2 is disposed corresponding to the third sub-pixel row SPXL3 included in the first pixel row PXL1 and the first sub-pixel row SPXL1 included in the second pixel row PXL2.

The left-eye data voltage DVL is applied to first sub-pixel electrodes SPE1 arranged in the first sub-pixel row SPXL1 of the first pixel row PXL1 and to the third sub-pixel electrodes SPE3 arranged in the third sub-pixel row SPXL3 of the second pixel row PXL2. In addition, the right-eye data voltage DVR is applied to the third sub-pixel electrodes SPE3 arranged in the third sub-pixel row SPXL3 of the first pixel row PXL1 and to the first sub-pixel electrodes SPE1 arranged in the first sub-pixel row SPXL1 of the second pixel row PXL2. The is black gray scale voltage DVB is applied to the second sub-pixel electrodes SPE2 arranged in the second sub-pixel row SPXL2 of the first pixel row PXL1 and to the second sub-pixel electrodes SPE2 arranged in the second sub-pixel row SPXL2 of the second pixel row PXL2.

In addition, the first retarder PL1 may be extended to correspond to at least a portion of the second sub-pixel row SPXL2 included in the k-th pixel row and the (k+1)th pixel row. The second retarder PL2 may be extended to correspond to a remaining portion of the second sub-pixel row SPXL2 included in the k-th pixel row and the (k+1)th pixel row. Thus, the first retarder PL1 and the second retarder PL2 may be disposed adjacent to each other in the area corresponding to the second sub-pixel row SPXL2.

Different from the display apparatus shown in FIGS. 12 to 16, the display apparatus in the present exemplary embodiment displays the left-eye image and the right-eye image in a unit of two sub-pixel rows, which are adjacent to each other but arranged in different rows, except for the first sub-pixel row SPXL1 included in the first pixel row and the third sub-pixel row SPXL3 included in the N-th pixel row PXLn.

Accordingly, the repeated number of the first retarders PL1 and the second retarders PL2 in the patterned retarder PL-4 shown in FIG. 17 may be reduced by nearly half when compared to the patterned retarder PL-3 shown in FIG. 14. As a result, the patterned retarder PL-4 may be easily manufactured and a manufacturing cost of the display apparatus may be reduced.

Figure 18:
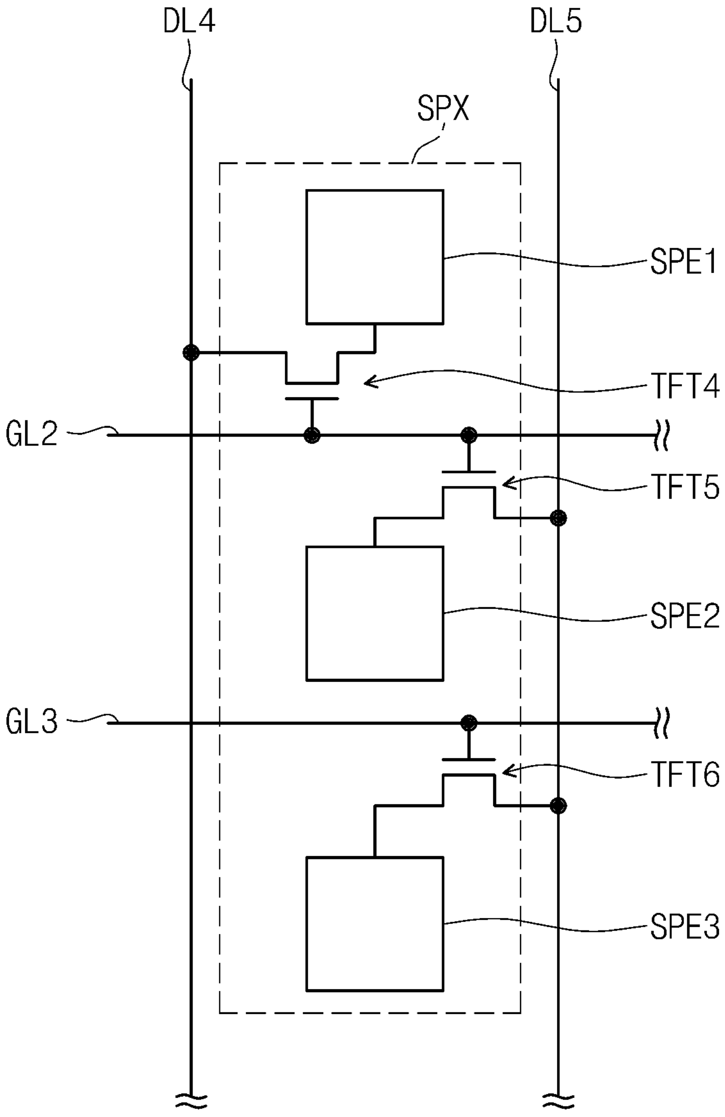
FIG. 18 is a partially enlarged view showing a sub-pixel of a first substrate according to another exemplary embodiment of the present invention.
Figure 19:
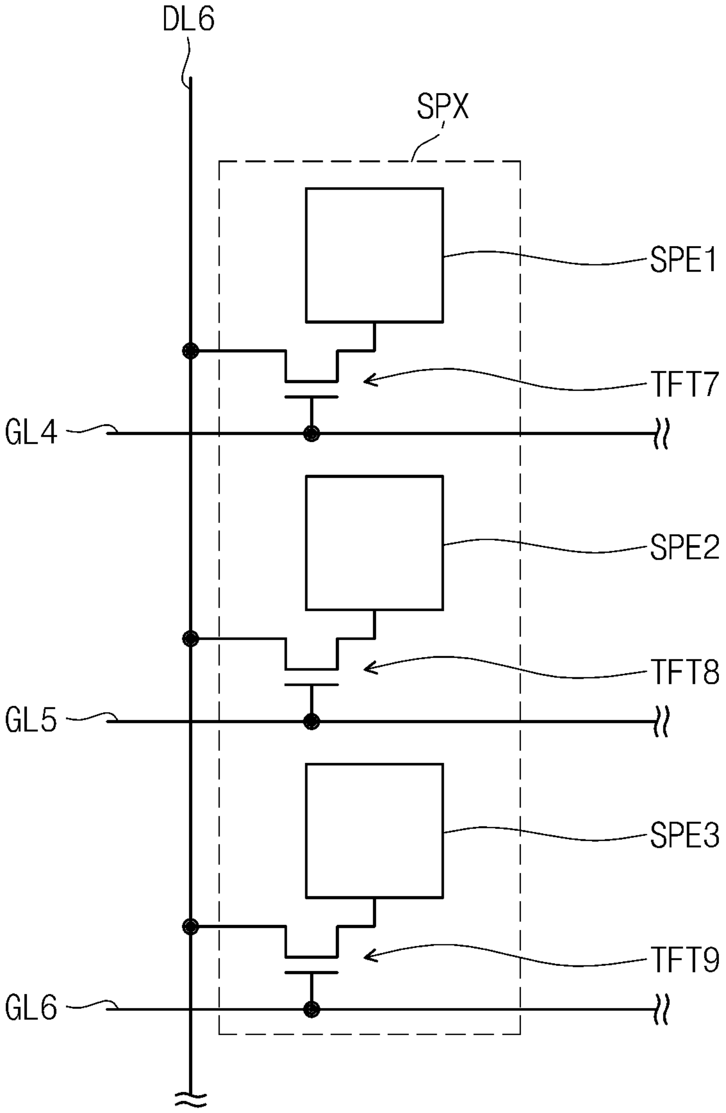
FIG. 19 is a partially enlarged view showing a sub-pixel of a first substrate according to another exemplary embodiment of the present invention.

FIG. 18 is a partially enlarged view showing a sub-pixel of a first substrate according to another exemplary embodiment of the present invention, and FIG. 19 is a partially enlarged view showing a sub-pixel of a first substrate according to another exemplary embodiment of the present invention. In FIGS. 18 and 19, the same reference numerals denote is the same elements in FIGS. 12 to 16, and thus detailed descriptions of the same elements will be omitted.

In the display apparatus shown in FIG. 18, each sub-pixel SPX includes fourth, fifth, and sixth thin film transistors TFT4, TFT5, and TFT6 to respectively switch the pixel voltages applied to the three sub-pixels electrodes SPE1, SPE2, and SPE3 that are individually driven. FIG. 18 shows one sub-pixel SPX, but the sub-pixel included in each pixel PX may have the same circuit configuration as the one sub-pixel shown in FIG. 18.

The gate lines GL1 to GLn include a second gate line GL2 and a third gate line GL3 substantially parallel to the second gate line GL2 and electrically insulated from the second gate line GL2. The data lines DL1 to DLm include a fourth data line DL4 insulated from the second and third gate lines GL2 and GL3 while crossing the second and third gate lines GL2 and GL3 and a fifth data line DL5 insulated from the second and third gate lines GL2 and GL3 while crossing the second and third gate lines GL2 and GL3. The fifth data line DL5 is substantially parallel to and insulated from the fourth data line DL4.

The fourth thin film transistor TFT4 is connected to the second gate line GL2, the fourth data line DL4, and the first sub-pixel electrode SPE1. The fifth thin film transistor TFT5 is connected to the second gate line GL2, the fifth data line DL5, and the second sub-pixel electrode SPE2, and the sixth thin film transistor TFT6 is connected to the third gate line GL3, the fifth data line DL5, and the sub-pixel electrode SPE3.

In the 2D mode, in a 1H time period in which the sub-pixel SPX is driven, a first gate voltage, which maintains a high state in an earlier H/2 time period during which the first sub-pixel electrode SPE1 and the second sub-pixel electrode SPE2 are driven, is applied to the second gate line GL2. In addition, in the 1H time period, a second gate voltage, which maintains is the high state in a later H/2 time period during which the third sub-pixel electrode SPE3 is driven, is applied to the third gate line GL3.

The fourth thin film transistor TFT4 and the fifth thin film transistor TFT5 are turned on in response to the first gate voltage. Accordingly, the first data voltage DV1 and the second data voltage DV2 respectively applied to the fourth data line DL4 and the fifth data line DL5 are provided to the first and second sub-pixel electrodes SPE1 and SPE2 through the turned-on fourth and fifth thin film transistors TFT4 and TFT5, respectively. Then, the sixth thin film transistor TFT6 is turned on in response to the second gate voltage, and the third data voltage DV3 applied to the fifth data line DL5 is provided to the third sub-pixel electrode SPE3 through the turned-on sixth thin film transistor TFT6. Thus, the first, second, and third sub-pixel electrodes SPE1, SPE2, and SPE3 are charged with the first, second, and third data voltages DV1, DV2, and DV3, respectively.

In the 3D mode, the left-eye data voltage DVL, the black gray scale voltage DVB, and the right-eye data voltage DVR are applied to the first, second, and third sub-pixel electrodes SPE1, SPE2, and SPE3, respectively. In detail, when the first gate voltage is applied to the second data line DL2 during the earlier H/2 time period, the left-eye data voltage DVL is applied to the first sub-pixel electrode SPE1 and the black gray scale voltage DVB is applied to the second sub-pixel electrode SPE2. When the second gate voltage is applied to the third data line DL3 during the later H/2 time period, the right-eye data voltage DVR is applied to the third sub-pixel electrode SPE3.

Consequently, the first and third sub-pixel electrodes SPE1 and SPE3 are charged with the left-eye data voltage DVL and the right-eye data voltage DVR, respectively, and the second sub-pixel electrode SPE2 is charged with the black gray scale voltage DVB.

Referring to FIG. 19, each sub-pixel SPX includes seventh, eighth, and ninth thin film transistors TFT7, TFT8, and TFT9 to switch pixel voltages applied to first, second, and third sub-pixel electrodes SPE1, SPE2, and SPE3 so that they are individually driven. In FIG. 19, one sub-pixel SPX has been shown, but the sub-pixel included in each pixel PX may have the same circuit configuration as the one sub-sub pixel shown in FIG. 19.

The gate lines GL1 to GLn include a fourth gate line GL4, a fifth gate line GL5 substantially parallel to and electrically insulated from the fourth gate line GL4, and a sixth gate line GL6 substantially parallel to and electrically insulated from the fifth gate line GL5. The data lines DL1 to DLm include a sixth data line DL6 insulated from the fourth, fifth, and sixth gate lines GL4, GL5, and GL6 while crossing the fourth, fifth, and sixth gate lines GL4, GL5, and GL6.

The seventh thin film transistor TFT7 is connected to the fourth gate line GL4, the sixth data line DL6, and the first sub-pixel electrode SPE1. The eighth thin film transistor TFT8 is connected to the fifth gate line GL5, the sixth data line DL6, and the second sub-pixel electrode SPE2. The ninth thin film transistor TFT9 is connected to the sixth gate line GL6, the sixth data line DL6, and the third sub-pixel electrode SPE3.

In the 2D mode, in a 1H time period in which the sub-pixel SPX is driven, a first gate voltage, which maintains a high state in an earlier H/3 time period during which the first sub-pixel electrode SPE1 is driven, is applied to the fourth gate line GL4. In addition, in the 1H time period, a second gate voltage, which maintains the high state in an intermediate H/3 time period during which the second sub-pixel electrode SPE2 is driven, is applied to the fifth gate line GL5. In the 1H time period, a third gate voltage, which maintains the high state in a later H/3 time period during which the third sub-pixel electrode SPE3 is driven, is applied to the sixth is gate line GL6.

The seventh, eighth, and ninth thin film transistors TFT7, TFT8, and TFT9 respectively output first, second, and third data voltages DV1, DV2, and DV3 provided from the sixth data line DL6 in response to the first, second, and third gate voltage. Accordingly, the first, second, and third data voltages DV1, DV2, and DV3 are charged in the first, second, and third sub-pixel electrodes SPE1, SPE2, and SPE3, respectively.

In the 3D mode, the seventh, eighth, and ninth thin film transistors TFT7, TFT8, and TFT9 are sequentially turned on during the 1H time period, and thus the left-eye data voltage DVL, the black gray scale voltage DVB, and the right-eye data voltage DVR may be sequentially charged in the first, second, and third sub-pixel electrodes SPE1, SPE2, and SPE3.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:

a driving circuit configured to receive an input image signal, convert the input image signal into a first data voltage and a second data voltage having different voltage levels from each other at a same gray scale in a two-dimensional (2D) mode, and convert the input image signal into a left-eye data voltage and a right-eye data voltage in a three-dimensional (3D) mode;

a display panel comprising a plurality of pixels configured to display a plurality of colors, each pixel comprising at least one sub-pixel comprising a first sub-pixel electrode and a second sub-pixel electrode configured to display a same color, the first and second sub-pixel electrodes configured to respectively receive a different one of the first and second data voltages in the 2D mode to display a first image and respectively receive a different one of the left-eye data voltage and the right-eye data voltage in the 3D mode to display a second image comprising a left-eye image and a right-eye image; and a patterned retarder disposed on the display panel configured to transmit the first image or the second image and comprising at least one first retarder configured to provide a first directivity to the left-eye image and at least one second retarder configured to provide a second directivity different from the first directivity to the right-eye image, the first retarder being disposed corresponding to one of the first sub-pixel electrode and the second sub-pixel electrode and the second retarder being disposed corresponding to the other one of the first sub-pixel electrode and the second sub-pixel electrode, wherein:

the first data voltage and the second data voltage have a same polarity; and the first data voltage has a voltage level based on a first gamma curve and the second data voltage has a voltage level based on a second gamma curve different from the first gamma curve over the entire grayscale range of the first and second gamma curves.

2. The display apparatus of claim 1, wherein the pixels are arranged in an N rows by M columns matrix, where N and M are natural numbers each greater than 1, and the first and second sub-pixel electrodes are arranged in a column direction.

3. The display apparatus of claim 2, wherein each of the N rows comprises a first sub-pixel row and a second sub-pixel row, the first sub-pixel electrode is positioned at the first sub-pixel row, and the second sub-pixel electrode is positioned at the second sub-pixel row.

4. The display apparatus of claim 3, wherein an area of the second sub-pixel electrode is greater than an area of the first sub-pixel electrode.

5. The display apparatus of claim 4, further comprising a plurality of the first retarders and the second retarders, the first retarders being disposed corresponding to the first sub-pixel row, and the second retarders being disposed corresponding to the second sub-pixel row.

6. The display apparatus of claim 5, wherein, in the 3D mode, a gamma curve of the left-eye data voltage is the same as a gamma curve of the right-eye data voltage, and the first sub-pixel electrode receives a voltage having a same level as a voltage applied to the second sub-pixel electrode at the same gray scale.

7. The display apparatus of claim 4, further comprising a plurality of the first retarders and the second retarders, the first retarders being disposed corresponding to the first sub-pixel row included in a k-th pixel row (k is an odd number lower than N) and the second sub-pixel row included in a (k+1)th pixel row among the N pixel rows, and the second retarders being disposed corresponding to the second sub-pixel row included in the k-th pixel row and the first sub-pixel row included in the (k+1)th pixel row among the N pixel rows.

8. The display apparatus of claim 4, further comprising a plurality of the first retarders and the second retarders, the first retarders being disposed corresponding to the first sub-pixel electrode of the sub-pixel included in a r-th pixel column (r is an odd number lower than M) and the second sub-pixel electrode of the sub-pixel included in a (r+1)th pixel column among the M pixel columns, and the second retarders being disposed corresponding to the second sub-pixel electrode of the sub-pixel included in the r-th pixel column and the first sub-pixel electrode of the sub-pixel included in the (r+1)th pixel column among the M pixel columns.

9. The display apparatus of claim 1, wherein each of the pixels comprises three sub-pixels arranged in a row direction, the display panel further comprises color pixels respectively corresponding to the pixels, and each of the color pixels comprises red, green, and blue sub-pixels arranged in the row direction to respectively correspond to the three sub-pixels.

10. The display apparatus of claim 1, wherein the display panel further comprises:

a first substrate comprising a plurality of gate lines and a plurality of data lines insulated from the gate lines while crossing the gate lines;

a second substrate facing the first substrate; and a liquid crystal layer disposed between the first substrate and the second substrate.

11. The display apparatus of claim 10, wherein the gate lines comprise a first gate line, the data lines comprise a first data line insulated from the first gate line while crossing the first gate line and a second data line insulated from the first gate line while crossing the first gate line, the second data line is substantially parallel to and electrically insulated from the first data line, the sub-pixel further comprises a first thin film transistor connected to the first gate line, the first data line, and the first sub-pixel electrode and a second thin film transistor connected to the first gate line, the second data line, and the second sub-pixel electrode.

12. The display apparatus of claim 10, wherein the gate lines comprise a second gate line and a third gate line substantially parallel to and electrically insulated from the second gate line, the data lines comprise a third data line insulated from the second and third gate lines while crossing the second and third gate lines, and the sub-pixel comprises a third thin film transistor connected to the second gate line, the third data line, and the first sub-pixel electrode and a fourth thin film transistor connected to the third gate line, the third data line, and the second sub-pixel electrode.

13. A display apparatus comprising:

a driving circuit configured to receive an input image signal, convert the input image signal into a first data voltage and a second data voltage having different voltage levels from each other at a same gray scale in a two-dimensional (2D) mode, and convert the input image signal into a left-eye data voltage and a right-eye data voltage in a three-dimensional (3D) mode;

a display panel comprising a plurality of pixels configured to display a plurality of colors, each pixel comprising at least one sub-pixel comprising a first sub-pixel electrode and a second sub-pixel electrode configured to display a same color, the first and second sub-pixel electrodes configured to respectively receive a different one of the first and second data voltages in the 2D mode to display a first image and respectively receive a different one of the left-eye data voltage and the right-eye data voltage in the 3D mode to display a second image comprising a left-eye image and a right-eye image; and a patterned retarder disposed on the display panel configured to transmit the first image or the second image and comprising at least one first retarder configured to provide a first directivity to the left-eye image and at least one second retarder configured to provide a second directivity different from the first directivity to the right-eye image, the first retarder being disposed corresponding to one of the first sub-pixel electrode and the second sub-pixel electrode and the second retarder being disposed corresponding to the other one of the first sub-pixel electrode and the second sub-pixel electrode, wherein:

the first data voltage has a voltage level based on a first gamma curve having a first gamma value and the second data voltage has a voltage level based on a second gamma curve having a second gamma value different from the first gamma value, the first data voltage and the second data voltage have a same polarity; and the first data voltage has a voltage level based on a first gamma curve having a first gamma value and the second data voltage has a voltage level based on a second gamma curve having a second gamma value different from the first gamma value.

* * * * *